(12) United States Patent
Rabie et al.

(10) Patent No.: US 7,417,995 B2
(45) Date of Patent: *Aug. 26, 2008

(54) METHOD AND SYSTEM FOR FRAME RELAY AND ETHERNET SERVICE INTERWORKING

(75) Inventors: Sameh Rabie, Kanata (CA); Osama Aboul Magd, Kanata (CA); Bashar Abdullah, Ottawa (CA); Baghdad Barka, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 596 days.

This patent is subject to a terminal disclaimer.

(21) Appl. No.: 10/990,899

(22) Filed: Nov. 17, 2004

(65) Prior Publication Data

US 2005/0157750 A1 Jul. 21, 2005

Related U.S. Application Data

(60) Provisional application No. 60/537,744, filed on Jan. 20, 2004.

(51) Int. Cl.
*H04L 12/28* (2006.01)
*H04L 12/56* (2006.01)

(52) U.S. Cl. .................... 370/401; 370/395.53
(58) Field of Classification Search ............ 370/395.53, 370/401
See application file for complete search history.

(56) References Cited

U.S. PATENT DOCUMENTS

| | | | |
|---|---|---|---|
| 6,611,522 B1 | 8/2003 | Zheng et al. | |
| 6,751,221 B1 | 6/2004 | Saito et al. | |
| 6,912,225 B1 * | 6/2005 | Kohzuki et al. | 370/412 |
| 7,277,442 B1 | 10/2007 | Holmgren et al. | |
| 2002/0031142 A1 | 3/2002 | Metin et al. | |
| 2002/0136224 A1 * | 9/2002 | Motley | 370/401 |
| 2002/0159462 A1 | 10/2002 | Demaria et al. | |
| 2002/0176450 A1 | 11/2002 | Kong et al. | |
| 2003/0031182 A1 | 2/2003 | O'Neil et al. | |
| 2003/0053464 A1 * | 3/2003 | Chen et al. | 370/400 |
| 2003/0067934 A1 | 4/2003 | Hooper et al. | |
| 2003/0076838 A1 | 4/2003 | Shalo et al. | |

(Continued)

OTHER PUBLICATIONS

Bot, "Key Technical Considerations When Using Ethernet Solutions in Existing ATM and Frame Relay Networks," *IEEE Communicaitons Magazine*, Mar. 2004, pp. 96-102.

(Continued)

*Primary Examiner*—Ronald Abelson
(74) *Attorney, Agent, or Firm*—Christopher & Weisberg, P.A.

(57) ABSTRACT

A method and system for interworking between an Ethernet communication network and a frame relay network, in which a first network interface is operable to communicate with the Ethernet communication network using an Ethernet communication protocol. A second network interface is operable to communicate with the frame relay communication network using a frame relay protocol. A processing unit is in communication with the first network interface and the second network interface, in which the processing unit terminates frames received from a one of the frame relay communication network and the Ethernet communication network and maps parameters corresponding to the received one of the frame relay and Ethernet frames into the other of the frame relay and Ethernet frames. The mapped parameters include circuit configuration control plane information and data plane parameters corresponding to individual frames.

44 Claims, 20 Drawing Sheets

U.S. PATENT DOCUMENTS

| | | |
|---|---|---|
| 2003/0103503 A1 | 6/2003 | Dubuc et al. |
| 2003/0118026 A1 | 6/2003 | Kuhl et al. |
| 2003/0126286 A1 | 7/2003 | Lee |
| 2004/0022255 A1 | 2/2004 | Chen et al. |
| 2004/0252717 A1* | 12/2004 | Solomon et al. ............ 370/466 |
| 2005/0141509 A1 | 6/2005 | Rabie et al. |
| 2005/0157729 A1* | 7/2005 | Rabie et al. ............ 370/395.53 |
| 2005/0169279 A1* | 8/2005 | Magd et al. ............... 370/395.5 |

OTHER PUBLICATIONS

Grossman et al, "Multiprotocol Encapsulation over ATM Adaptation Layer 5" (rfc2684), Sep. 1999, entire document. Downloaded from http://www.faqs.org/rfcs/rfc2684.html (Address valid as of Sep. 5, 2006).

* cited by examiner

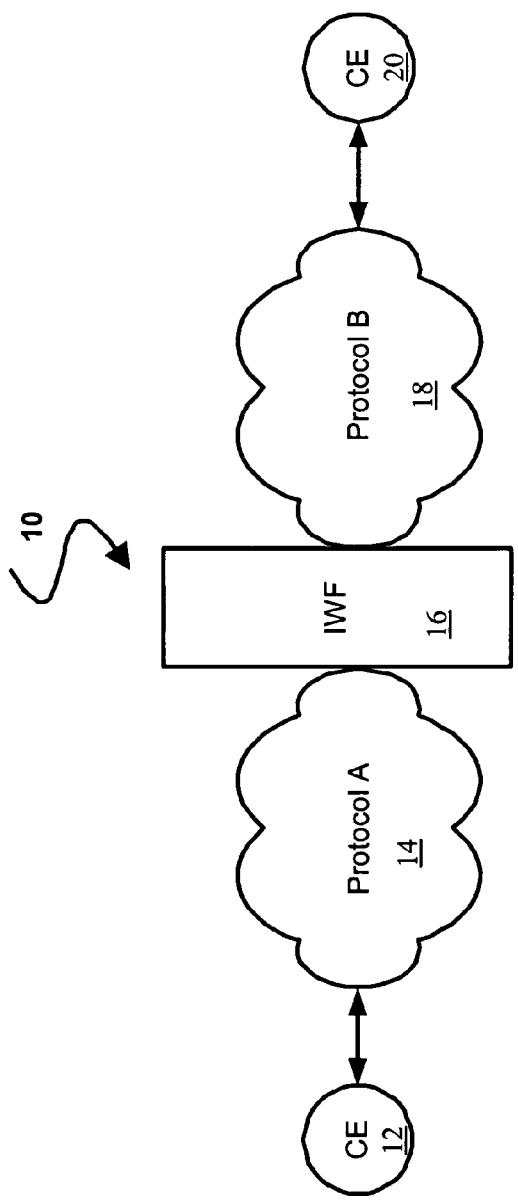
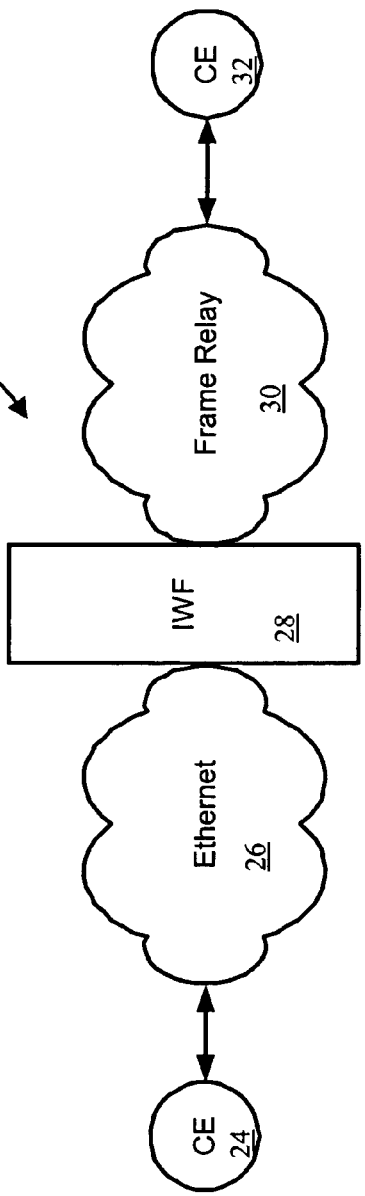
FIG. 1A
FIG. 1B

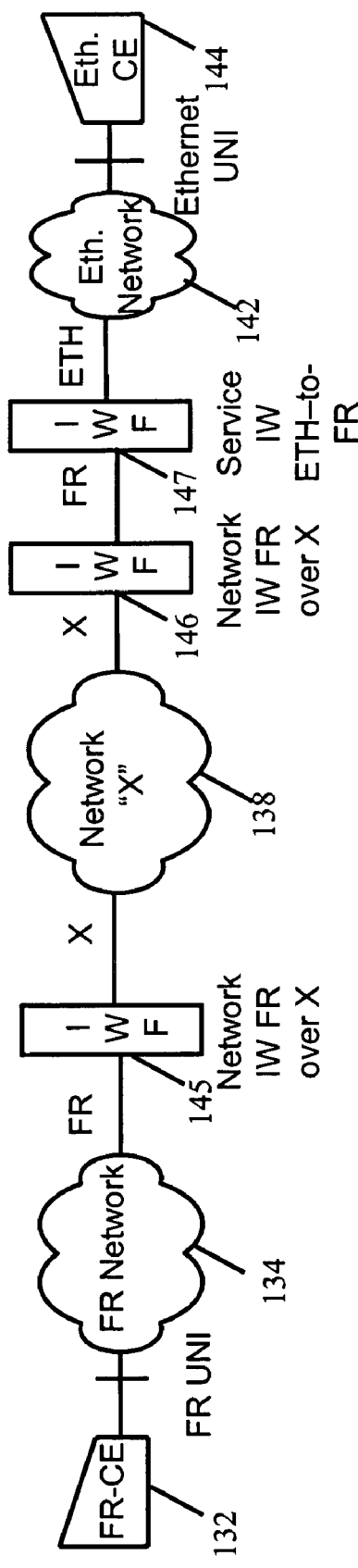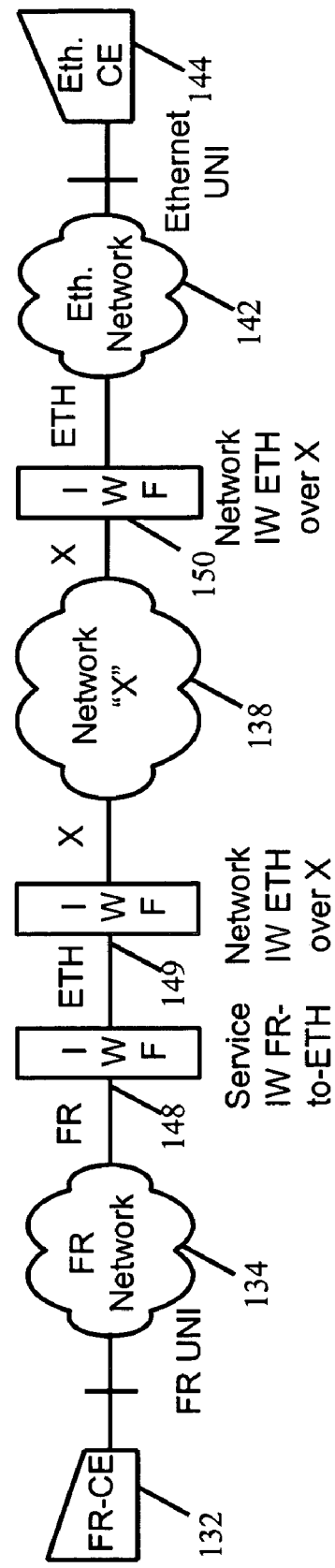
FIG. 6A
FIG. 6B

| Class 202 | Network Support 204 | Frame Loss Ratio 206 | Frame Transfer Delay 208 | Frame 210 Delay Variation |
|---|---|---|---|---|
| 0 | Mandatory Default | Not specified | Not specified | NA |
| 1 | Mandatory | $<10^{-3}$ | $<400$ ms (95% percentile) | $<52$ ms |
| 2 | Optional | $<3\times10^{-5}$ | $<400$ ms | $<17$ ms |
| 3 | Optional | $<3\times10^{-5}$ | $<150$ ms | $<17$ ms |

| FR → Ethernet Direction | |
|---|---|
| CBS = Bc, EBS = Be, CBS/CIR$_E$=EBS/EIR$_E$=Tc | 272, 274 |
| CIR$_E$ =Bc/Tc, CBS=Bc, EIR$_E$ = AR − CIR$_E$, EBS = EIR$_E$*Tc | 276 |

| Ethernet → FR direction | |
|---|---|
| Bc = CBS, CIR$_F$=CIR$_E$, EIR$_F$=EIR$_E$ | 278, 280 |
| Bc = CBS, CIR$_F$=CIR$_E$, Be=EBS | 282 |
| Bc = CBS, Be = EBS, Tc=(CBS+EBS)/(CIR+EIR) | 284 |

FIG. 12

| Peak Information Rate (PIR) 294 | Committed information rate (CIR) 296 | Peak Burst Size (PBS) 298 | Committed Burst Size (EBS) 300 |

Ethernet RFC 2698 Traffic Paramenters 302

| Commited Burst Size (Bc) 252 | Excess burst size (Be) 254 | Duration (Tc) 256 | Access Rate (AR) 258 |

Frame Relay Traffic Paramenters 260

FIG. 13

| FR → Ethernet Direction | 304 |
|---|---|
| PIR=(Bc+Be)/Tc, $CIR_E$=Bc/Tc, CBS= Bc, and PBS=Bc+Be | 306 |
| PIR = AR, $CIR_E$=Bc/Tc, CBS= Bc, allowed $EIR_F$=AR – CIR allowed Be = infinity | 308 |

| Ethernet → FR direction | 310 |
|---|---|
| When PBS > CBS<br>$CIR_F$ = $CIR_{E'}$ Bc = CBS, and $EIR_F$ = PIR – CIR | 312 |
| When PBS > CBS<br>$CIR_F$ = $CIR_{E'}$ Bc = CBS, and Be = PBS – CBS | 314 |
| PBS < CBS (CE traffic shaping)<br>$CIR_F$ = $CIR_{E'}$ Bc = CBS, and $EIR_F$ = PIR – CIR | 316 |

| Ethernet p-bits | ETH PHB | ETH Service Class | FR Service Class | FR DLC ID | FR TP/DP | FR DE |
|---|---|---|---|---|---|---|
| 111 | EF | Platinum | Real-time | 1 | TP 15, DP 7 | 0 |
| 110 | AF31 | Gold | Real-time | 1 | "" | 0 |
| 101 | AF32 | Gold | Real-time | 1 | "" | 1 |
| 100 | AF21 | Silver | Mission-critical data | 2 | TP 10, DP 4 | 0 |
| 011 | AF22 | Silver | Mission-critical data | 2 | "" | 1 |
| 010 | AF11 | Bronze | Regular Data | 3 | TP 2, DP 0 | 0 |
| 001 | AF12 | Bronze | Regular Data | 3 | "" | 1 |
| 000 | DF | Best Effort | Regular Data | 3 | "" | 1 |

METHOD AND SYSTEM FOR FRAME RELAY AND ETHERNET SERVICE INTERWORKING

CROSS-REFERENCE TO RELATED APPLICATIONS

This application is related to and claims priority to U.S. Patent Application No. 60/537,744, filed Jan. 20, 2004, entitled, ETHERNET DIFFERENTIATED SERVICES, the entirety of which is incorporated herein by reference.

STATEMENT REGARDING FEDERALLY SPONSORED RESEARCH OR DEVELOPMENT n/a

BACKGROUND OF THE INVENTION

1. Statement of the Technical Field

The present invention relates to the field of networking communications and more particularly to a method and system for allowing efficient communications across disparate networking technologies such as frame relay and ethernet.

2. Description of the Related Art

Network technologies are not homogeneous. End-to-end connections can span multiple networking technologies, for example, Ethernet, asynchronous transfer mode (ATM), frame relay (FR), multi-protocol label switching (MPLS), and Internet protocol (IP). In addition, an Ethernet network may include multiple customer edge devices, switches, and routers. These components may communicate using different protocols, spanning the various layers of the OSI interworking model (e.g., L1-L7). For example, routers communicate using a layer three (L3) protocol while the switches communicate using a layer two (L2) protocol.

While solutions have been proposed to allow the transport of data between end points supported by disparate technologies, such solutions are typically inefficient and inadequate solutions such as encapsulation and data extraction and simple repacketizing. These solutions fail to consider or address the preservation of aspects of the data transport environment such as quality of service, prioritization, etc. For example, class of service bits in an Ethernet frame are ignored and/or dropped when current technologies convert or encapsulate the data for delivery on the frame relay portion of the network.

It is desirable to have an internetworking solution which allows the transport of frame relay originated data to an ethernet-based destination, and vice-versa, in a manner which preserves, throughout the network, networking features associated with the originating networking technology.

SUMMARY OF THE INVENTION

The invention describes an architecture and methods that enable service interworking between Ethernet and frame relay networks with single or multiple QoS levels, with different levels of performance guarantees. Service interworking enables end users to communicate using different networking protocols, without performing any specific protocol interworking functions. The method and system of the present invention are also more bandwidth efficient than the network interworking methods that encapsulate the entire frame of one protocol by the other protocol. The architecture provides flexibility in the location and functions of the internetworking function device, and describes methods for direct interworking or interworking over other network technologies.

According to one aspect, the present invention provides a device for interworking between an Ethernet communication network and a frame relay network, in which a first network interface is operable to communicate with the Ethernet communication network using an Ethernet communication protocol. A second network interface is operable to communicate with the frame relay communication network using a frame relay protocol. A processing unit is in communication with the first network interface and the second network interface, in which the processing unit terminates frames received from a one of the frame relay communication network and the Ethernet communication network and maps parameters corresponding to the received one of the frame relay and Ethernet frames into the other of the frame relay and Ethernet frames. The mapped parameters include circuit configuration control plane information and data plane parameters corresponding to individual frames.

According to another aspect, the present invention provides a method for service interworking between an Ethernet communication network and a frame relay network, in which frames received from a one of the frame relay communication network and the Ethernet communication network are terminated. Parameters corresponding to the received one of the frame relay and Ethernet frames are mapped into the other of the frame relay and Ethernet frames. The mapped parameters include circuit configuration control plane information and data plane parameters corresponding to individual frames.

According to yet another aspect, the present invention provides a storage medium storing a computer program which when executed by a processing unit performs a method for service interworking between an Ethernet communication network and a frame relay network, in which the frames received from a one of the frame relay communication network and the Ethernet communication network are terminated. Parameters corresponding to the received one of the frame relay and Ethernet frames are mapped into the other of the frame relay and Ethernet frames. The mapped parameters include circuit configuration control plane information and data plane parameters corresponding to individual frames.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1A is a block diagram of an interface between two networks with different protocols;

FIG. 1B is a block diagram of a system having an Ethernet network segment and a frame relay network segment;

FIG. 6A is a block diagram of a network architecture;

FIG. 6B is a block diagram of a network architecture;

FIG. 8 is a table of service levels;

FIG. 12 is a table of traffic parameter calculations;

FIG. 13 is a block diagram of frame relay and Ethernet RFC 2698 traffic parameters;

FIG. 14 is a table of traffic parameter calculations;

FIG. 20 is a table showing an example of mapping between Ethernet p-bits and frame relay connections.

DETAILED DESCRIPTION OF THE PREFERRED EMBODIMENTS ARCHITECTURE

Figure 2:
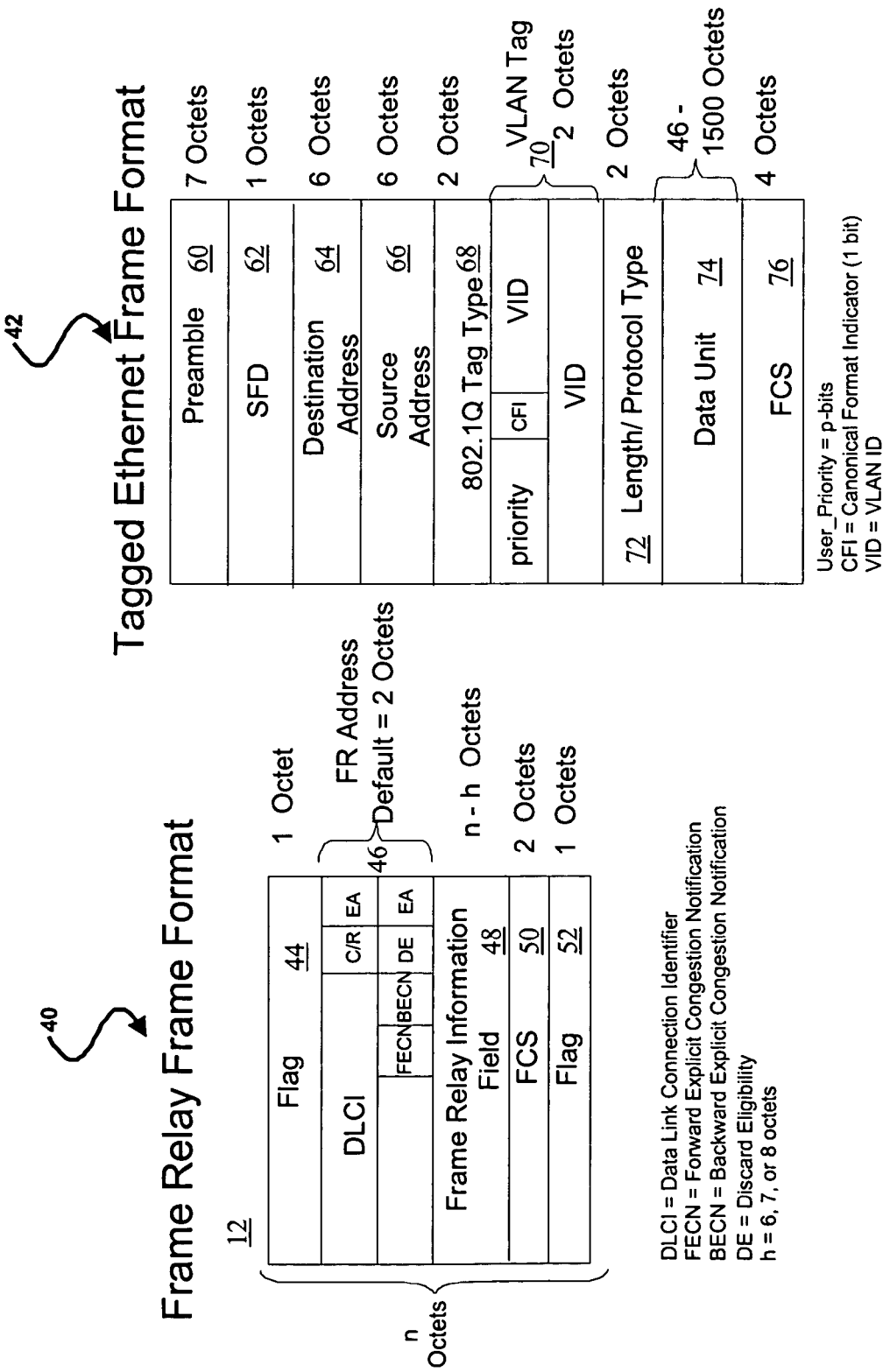
FIG. 2 is a block diagram of a frame relay frame and an Ethernet frame.

Referring now to the drawing figures in which like reference designators refer to like elements, there is shown in FIG. 1A, a system constructed in accordance with the principles of the present invention and designated generally as "10". System 10 includes two network segments connected by an interworking function (IWF) device 16. The two segments, network segment 14 and network segment 18, operate using different types of protocols. The protocols can include, for example, Ethernet, asynchronous transfer mode (ATM), frame relay (FR), multi-protocol label switching (MPLS), and Internet protocol (IP). Customer edge (CE) devices 12 and 20, for example, routers, switches, etc. are coupled to network segments 14 and 18, respectively, and serve to interface customer networks (not shown) to system 10. Router, switches, etc. for interconnecting a customer device or network to another network such as a service provider network are known in the art. In the most general sense, the IWF device 16 provides interworking functionality and maps relevant parameters from protocol A (network segment 14) to parameters for protocol B (network segment 18).

Referring to FIG. 1B, a particular example of a system 22 including two network segments connected by an IWF device 28 is shown. The IWF device 28 is disposed between the edges of an Ethernet network 26 and a frame relay network 30. Each network includes connections to customer edge devices such as devices 24 and 32. IWF device 28 can be a stand alone computing device arranged to implement the functionality described herein or can be integrated as part of other networking components such as routers and switches as are known in the art. If implemented as a stand alone computing device, IWF device 28 includes a processing unit, memory, input and output interfaces as well as network communication interfaces as may be implemented by one of skill in the art to implement the functions described herein.

Referring to FIG. 2, the format of a frame relay frame 40 and the format of an Ethernet frame 42 such as may be transported on ethernet network 26 and frame relay network 30 are shown. The frame relay frame 40 includes 'n' octets. Of the 'n' octets, one octet is dedicated to a flag 44 at the beginning of the frame, two octets are dedicated to the FCS field 50, and one octet is dedicated to a flag 52 at the end of the frame. The address information 46 of a frame relay frame has a default length of two octets, however this length can be extended to three or four octets. Of the 'n' octets 'n-h' octets are dedicated to the frame relay information field 48 where 'h' is typically between six and eight octets depending on the length of the other fields.

As is readily seen in FIG. 2, the format of a tagged Ethernet frame 42 differs from that of the frame relay frame 40. The tagged Ethernet frame 42 includes a seven octet preamble 60, a one octet start-of-frame delimiter (SFD) field 62, a six octet destination address 64, a six octet source address 66, a two octet 802.1Q tag 68, a two octet VLAN tag 70, a two octet length/protocol type field 72, and a four octet FCS field 76. In addition to the addressing and service information, a 46-1500 octet data unit 74 is included in the tagged Ethernet frame 42. Of note, the VLAN tag 70 includes a user priority, also known as "p-bits". Of note, although FIG. 2 shows a preamble 60 and start-of-frame delimiter field (SFD) 62 applicable to IEEE 802.3 specific media, it should be recognized that IEEE 802.3 Carrier Sense Multiple Access with Collision Detection (CSMA/CD) is used as an example and that the present invention is applicable to other media types defined by other framing arrangements, such as IEEE 802.11 wireless, etc.

When a packet or frame is forwarded between networks 26 and 30, the IWF device 28 terminates the protocol used in one network, and translates and/or maps its protocol control information to that of the protocol used in the other network. This is done for the data plane and control plane, both of which are described below in detail. In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

Figure 3:
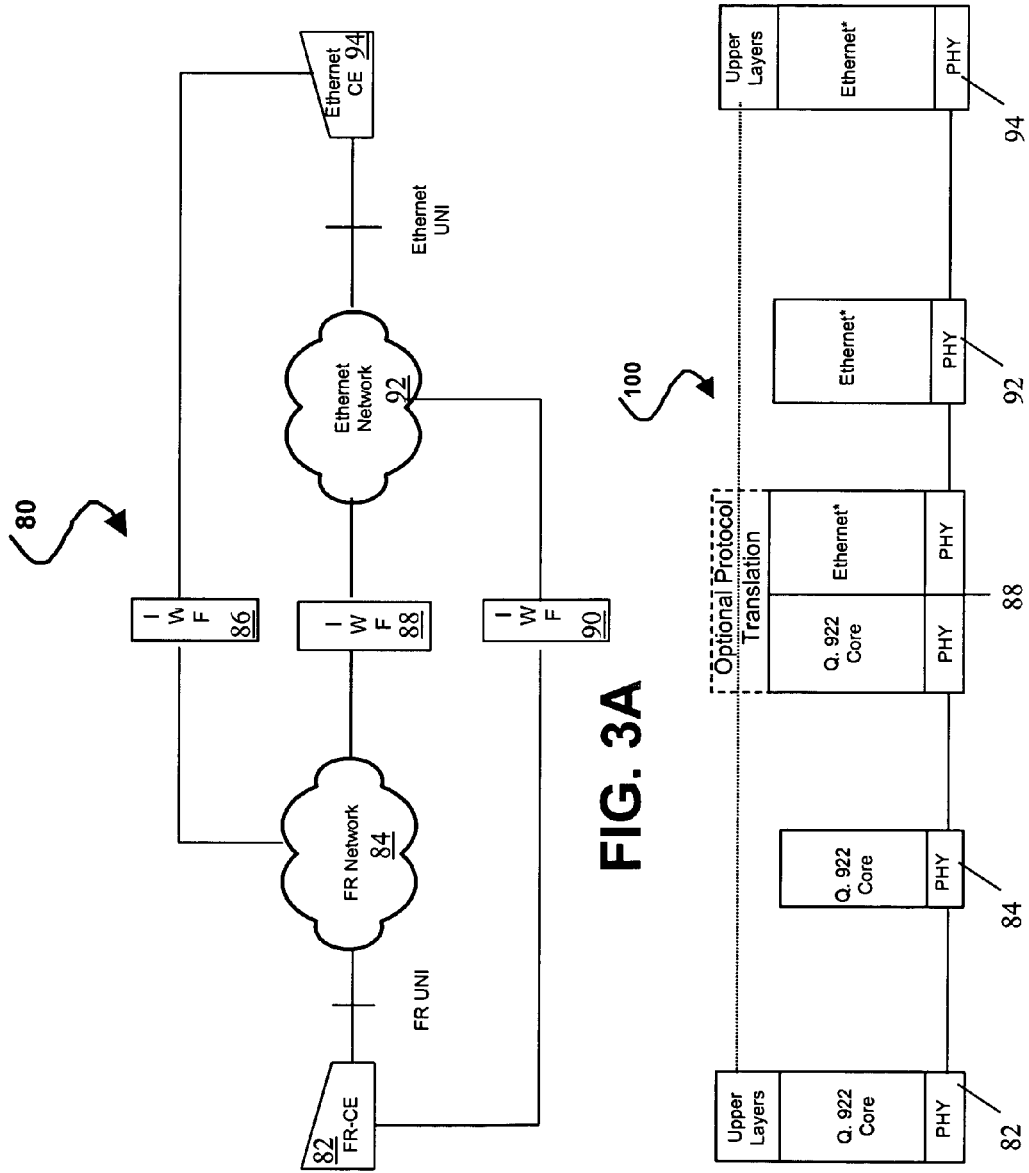
FIG. 3A is a block diagram of a network architecture.
FIG. 3B is a block diagram of a protocol stack.

An architecture suitable for encapsulation and/or translation constructed in accordance with the principles of the present invention is described with reference to FIGS. 3A and 3B. Referring to FIG. 3A, a network architecture 80 is shown in which the IWF can be located at any of a plurality of locations within the network. The architecture 80 includes a frame relay customer edge device 82 and an Ethernet customer edge device 94. A frame relay network 84 and an Ethernet network 92 connect the frame relay customer edge device 82 and the Ethernet customer edge device 94. An IWF device provides an interface between the frame relay network 84 and an Ethernet network 92 or between a customer edge device of one type and a network of a different type. For example, IWF device 88 provides an interface between the frame relay network 84 and an Ethernet network 92. An IWF such as IWF device 86 provides an interface between the frame relay network 84 and the Ethernet customer edge device 94, and IWF device 90 provides an interface between the frame relay customer edge device 82 and the Ethernet network 92. The IWF can physically reside in the Ethernet customer edge 94 or Ethernet network 92, frame relay customer edge 82 or frame relay network 84, or in a separate device between the networks or at the user-network interface. This provides significant interworking flexibility. The chosen configuration in any particular network will depend on several factors such as equipment cost and capabilities (both on the network and customer sides), current network deployment, and network evolution strategy.

Referring to FIG. 3B shows a protocol-based view of the architecture of FIG. 3A taken from customer edge device 82 to customer edge device 94 via IWF 88. As is shown in FIG. 3B, the devices are interconnected to provide a physical path from frame relay CE 82 to Ethernet CE 94. The frame relay-based elements (CE 82, network 84 and a portion of IWF 88 also include a core arranged to support the native frame relay protocol, e.g. a Q.922 core.

To support service interworking, upper layer protocols such as IP, IPX, etc. are encapsulated. For example, Internet Engineering Task Force (IETF) Request for Comment (RFC) 2427 defines an encapsulation procedure for upper layer protocols over Frame Relay. Encapsulation procedures are available for both routed and bridged encapsulation mode frames. Encapsulation formats can be based on network layer protocol id (NLPID) and service network access point (SNAP). Point-to-point protocol (PPP) encapsulation over frame relay is defined in RFC 1973. The PPP Protocol provides a standard method for transporting multi-protocol packets over point-to-point links. Standards also exist for encapsulating upper layer protocols (ULPs) over Ethernet, for example RFC 894 for IP and RFC 2516 for PPP. RFC 894 for IP and RFC 2516 for PPP are incorporated herein by reference. It is also contemplated that IWF 28 can translate these upper layer protocols.

The service interworking methods described herein preferably use a routed encapsulation mode. In addition to frame encapsulation, to forward the packet to the appropriate destination as described in the standards listed above, in accordance with the present invention, IWF device 88 provides service and parameter mapping between the frame relay network 84 and the Ethernet network 92.

Of note, the asterisk next to the term "Ethernet" in IWF 88, Ethernet network 92 and Ethernet CE 94 in FIG. 3B refers to the ability of the present invention to support both virtual local area network (VLAN) aware and VLAN unaware ethernet options. VLANs and the concepts employed by virtual networking are known in the art. In general, VLAN aware Ethernet includes packets arranged according to the base Ethernet standard, e.g. Institute of Electrical and Electronics Engineers (IEEE) standards 802.3N2 as well as a "Q-tag" under IEEE 802.1Q. The present invention is applicable to implementations of VLAN unaware (use only of base Ethernet 802.3N2) Ethernet networks as well as VLAN aware Ethernet networks. It is also contemplated that the present invention can be implemented in a manner that is independent of the physical media. For example, it is contemplated that the present invention can be implemented using the IEEE 802.11 wireless technologies.

Service interworking applies when a Frame Relay service user interworks with an Ethernet service user. The Ethernet service user performs no Frame Relay specific functions, and Frame Relay service user performs no Ethernet service specific functions. In the Ethernet to FR direction, the IWF terminates the Ethernet protocol and maps its information into the FR protocol. The reverse occurs in the FR to Ethernet direction. In addition, the IWF may also perform translation of the ULP encapsulation information.

At the Ethernet side, the Length/Type field in the Ethernet frame header identifies the ULP transported, e.g. IP (RFC 894) or PPP (RFC 2516). At the Frame Relay side, ULP is encapsulated using an encapsulation method such as the encapsulation procedure described in Request for Comment ("RFC") 2427 or RFC 1973 (for the point-to-point protocol). The IWF (e.g., IWF 86, 88, or 90) performs the ULP encapsulation translation from frame relay to Ethernet and vice versa. When encapsulation methods are not standardized, but they are compatible between terminal equipment (e.g. packet voice), the IWF may operate in transparent mode.

Note that service and network interworking use "encapsulation" differently. In network interworking, the entire frame is encapsulated. For example, the Ethernet user/CE would send an IP-over-Ethernet frame. The IWF would encapsulate the entire frame over FR. The transported core frame would contain the original (IP payload+Ethernet header)+frame relay encapsulation header. No ULP "translation" is needed.

In service interworking, the subject of the present invention, the Ethernet header is not transported when going from Ethernet to FR. The IP payload is extracted by the IWF from the frame, and transported directly over the second protocol.

In translation mode, an additional step is performed: the Layer 2 (L2) encapsulation header of the source protocol (Ethernet or FR) is used to derive the L2 encapsulation of the destination protocol.

Figure 4:
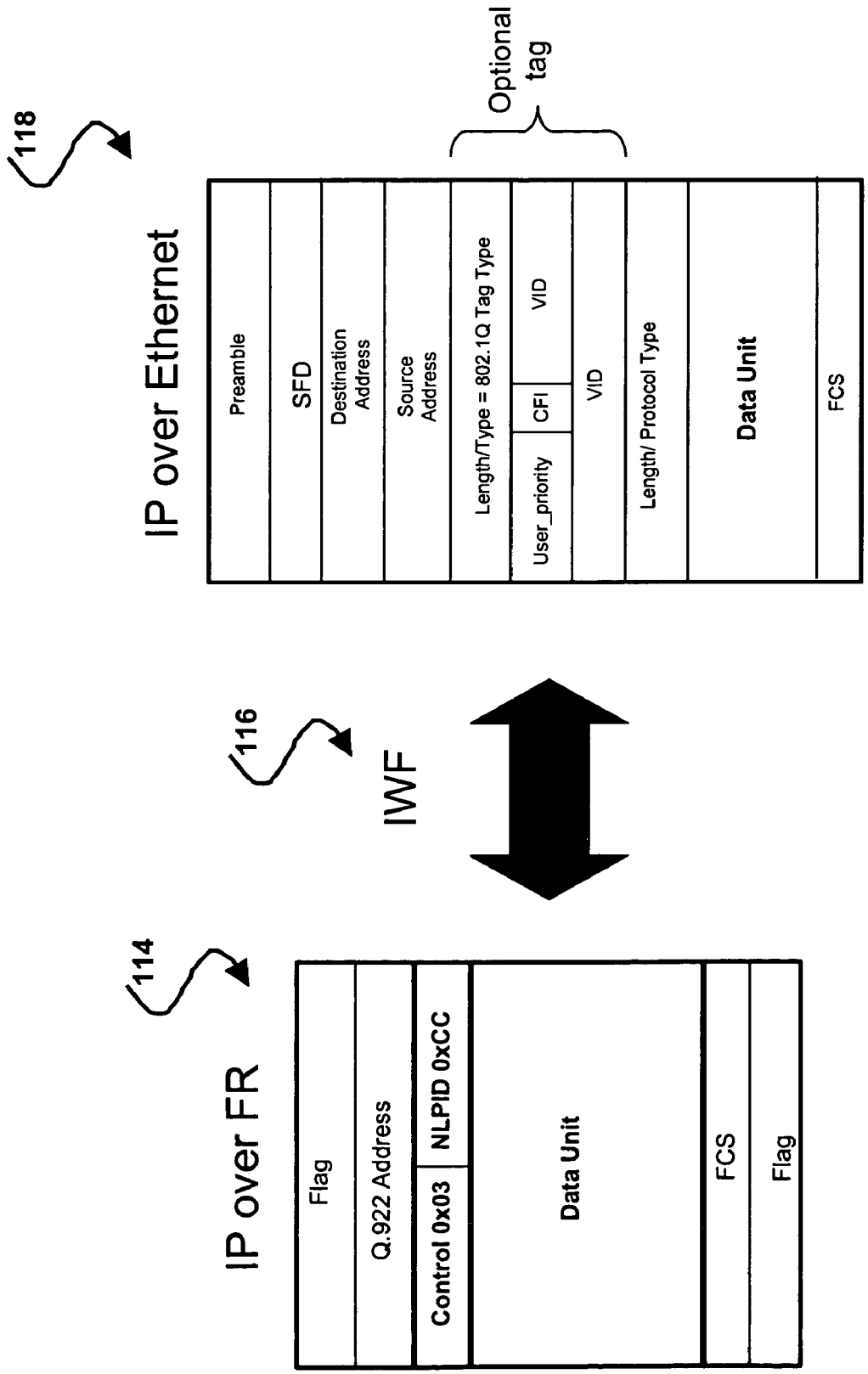
FIG. 4 is a block diagram of an IP over frame relay frame and an IP over Ethernet frame.

Encapsulation of an upper layer protocol is explained. Referring to FIG. 4, an example of a routed encapsulation mode frame is shown using the internet protocol (IP) as an example of a ULP. It is contemplated that other ULPs, such as the point-to-point protocol (PPP), Internetwork Packet Exchange (IPX), etc. can be supported. It can be desirable to carry IP end-to-end using Ethernet-to-FR service interworking. This is sometimes referred to as a "routed encapsulation mode." To carry the IP information end-to-end, an IWF 116 provides interworking between the IP over frame relay 114 and an IP over Ethernet from 118. Of note, the NLPID corresponding to IP in the frame relay frame is recognized by the IWF 116 and the corresponding identifier that the Ethernet frame includes IP as its ULP is established in the Ethernet Length/Protocol Type field, and vice versa. Accordingly, the IWF 116 creates the encapsulated ULP packet by recognizing the ULP in the arriving packet and creating a corresponding ULP entry in the outgoing packet. Other FR and Ethernet ULP encapsulation formats may be used, such as the RFC 2427 SNAP option and/or the Ethernet 802.3 LLC/SNAP encapsulation.

Figure 5:
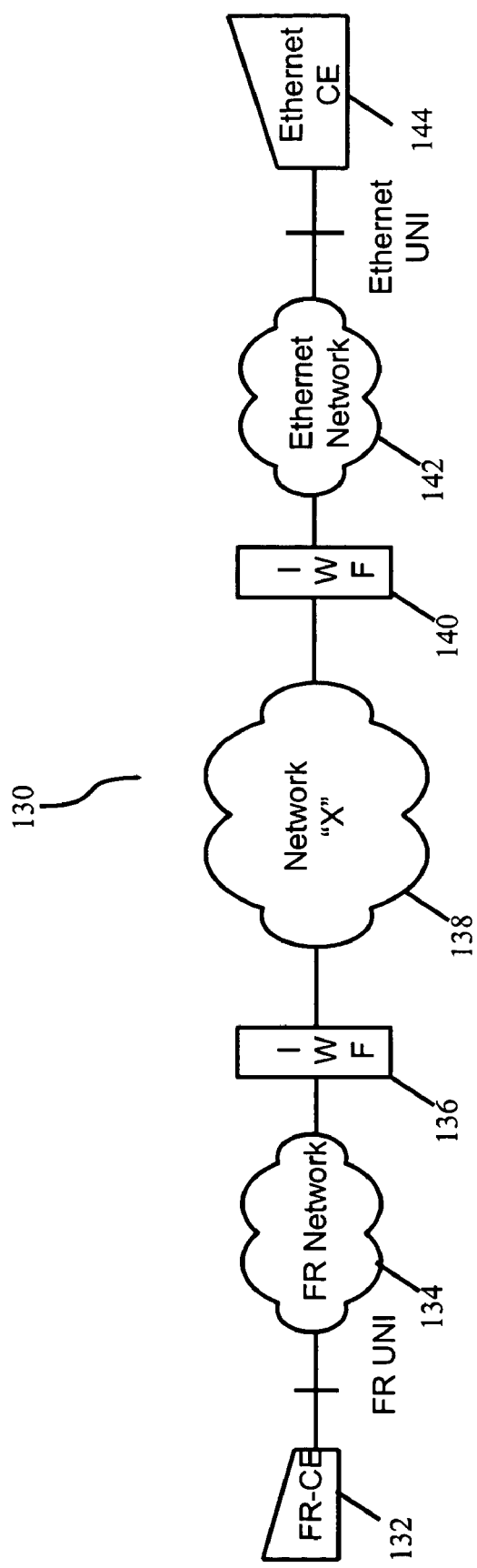
FIG. 5 is a block diagram of a network architecture.

Referring to FIG. 5, it is contemplated that the present invention can support service interworking via a third technology, shown as network 'X' 138 in architecture 130. For example, Ethernet to frame relay interworking can be achieved through a technology such as ATM, where network X is an ATM network. In this architecture, the IWF device 136 performs service interworking between the ATM network and a frame relay network 134 as described in the MPLS/FR Alliance standard, FRF.8. A second IWF device 140 performs service interworking between the ATM network 138 and the Ethernet network 142. This allows end to end transport of data between the frame relay customer edge device 132 and the Ethernet customer edge device 144. While in the example above, the interworking via a third technology includes an ATM core, other core networks can be used. For example, the interworking could be achieved over an MPLS core. In the case where network 'X' 138 is an MPLS backbone network, IWF device 136 would perform frame relay to MPLS service interworking and IWP device 140 would perform MPLS to Ethernet service interworking.

Referring to FIGS. 6A and 6B, an alternate network architecture for interworking over a third technology is shown. In this method, multiple IWFs provide the interworking. One of the IWFs (e.g., IWF 147 in FIG. 6A or IWF 148 in 6B) performs ETH-to-FR (or FR-to-ETH) service interworking as described herein. The resulting protocol is transported over the third core technology (e.g., over ATM network 138) using two network Interworking Functions (e.g., IWFs 145, 146, 149, 150) at both ends of the core network.

Another method of providing service interworking over a third networking communication technology is described with reference to FIGS. 6A and 6B. As shown in FIGS. 6A and 6B, one of the IWFs performs service interworking (Ethernet to frame relay or vice versa). The resultant protocol is transported over the network "X' 138 using a networking IWF at the ends of the network "X" 138. In FIG. 6A, the service interworking occurs between the network "X" 138 and the Ethernet network 142 via IWF 147. In this example, a frame relay frame will be transported across the third technology using network IWFs 145 and 146 at both edges of network "X" 138. In FIG. 6B, the service interworking occurs between frame relay network 134 and the network "X" 138. In this example, an Ethernet frame is transported across this third technology using network IWFs 149 and 150 at both edges of network "X" 138.

The physical implementation of the IWFs is flexible: they may be combined together, deployed in separate devices, or combined with existing network elements. While the example above shows a network "X" 138, like the network shown and described with respect to FIG. 5, network types such as ATM and MPLS are contemplated.

Figure 7:
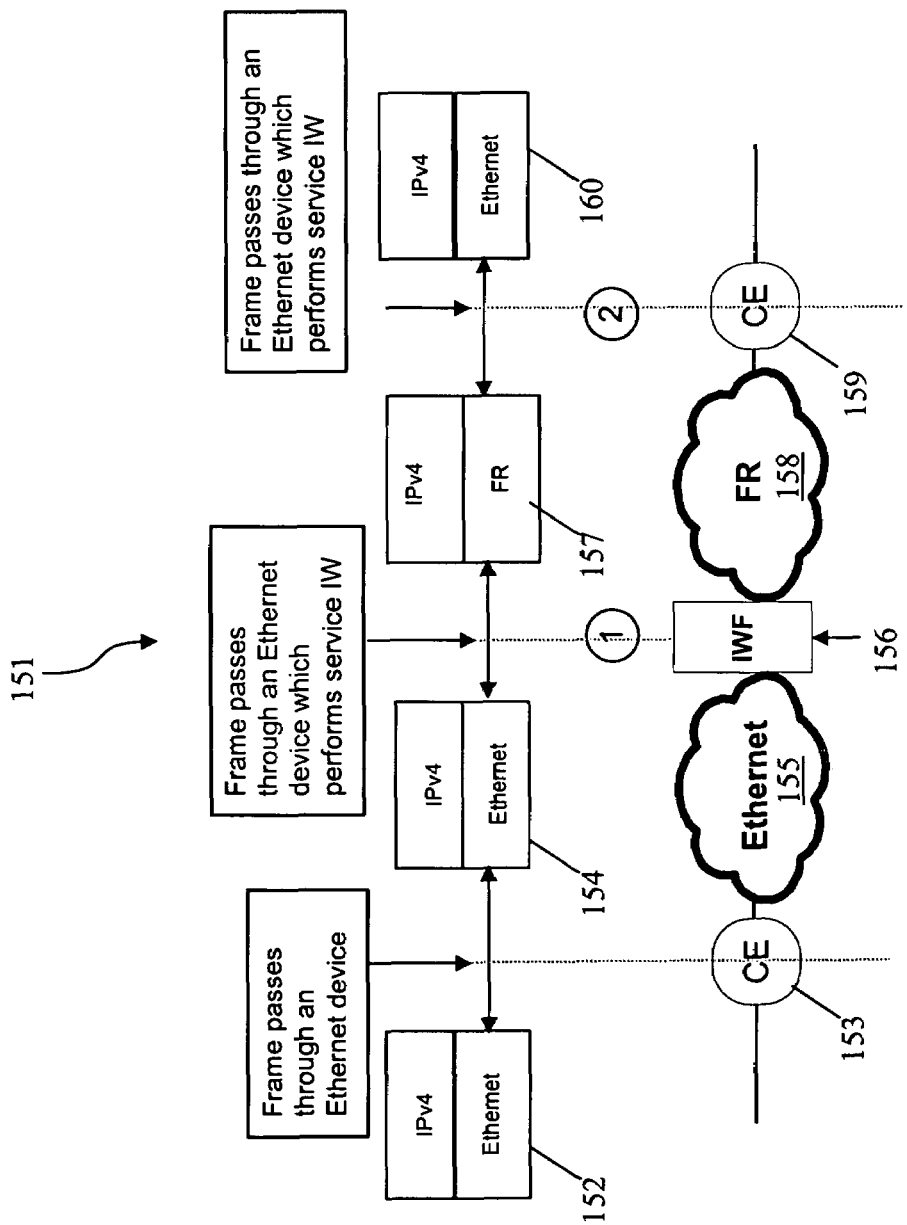
FIG. 7 is a block diagram of an interworking example.

Referring to FIG. 7, an example architecture 151 that provides router connectivity through L2 Ethernet and frame relay provider networks is shown. In this example, there is one provider with two networks. The architecture 151 includes two Ethernet-based IP networks with CE devices 153 and 159 connected by an Ethernet network 155 and a frame relay network 158. Frames can be delivered from a device on one IP network to a device on the other IP network using IWF devices to perform service interworking between the Ethernet and frame relay protocols. The IPv4 frame is encapsulated with the appropriate format for each network. For example, frame 154 includes the IPv4 frame encapsulated for an Ethernet network for delivery within Ethernet network 155 while frame relay frame 157 includes the IPv4 frame encapsulated for a frame relay network for delivery within frame relay network 158. The interworking functions map the ULP/IP service parameters (for example, traffic, QoS) to the Ethernet/frame relay equivalent parameters. Additional value-added Layer 3 (L3) specific functions such ARP mediation can be performed by the provider Service IW Function.

To deliver a frame from CE device 153 to CE device 159, the frame passes through both the Ethernet network 155 and the frame relay network 158. After the frame passes from CE device 153 through the Ethernet network 155, IWF 156 de-encapsulates the IP frame from the Ethernet frame 154 and encapsulates the IP frame in a frame relay frame 157, and performs other Ethernet-to-FR service IW functions. A second interworking function occurs at the CE device 159. CE device 159 de-encapsulates the IP frame from the frame relay frame 157 and encapsulates it in an Ethernet frame 160 for subsequent delivery.

To deliver a frame from CE device 159 to CE device 153, the frame passes through both the frame relay network 158 and the Ethernet network 155. CE device 159 includes service interworking functionality, and de-encapsulates the IP frame from the Ethernet frame 160 and encapsulates it in a frame relay frame 157. IWF device 156 de-encapsulates the IP frame from the frame relay 157 frame and encapsulates it in an Ethernet frame 154 for delivery through the Ethernet network 155.

The IWF can be implemented as a separate unit, as part of a CE device or as part of a provider edge (PE) device such as a provider-owned router or switch. It is also contemplated that the IWF can be implemented at the network to network interface (NNI) between provider networks. For example, in the case where the provider network is based on Metro Ethernet Forum (MEF) standards as are known in the art, the present invention can be implemented by extending these standards to allow the deployment of the IWF in the PE device, such as a PE device that interfaces a frame relay CE to the service provider Ethernet network. In the case where the provider network is a Frame Relay Network, the PE device including the IWF is one that interfaces an Ethernet CE device to the provider frame relay network.

In both cases, the frame relay data link connections are mapped to corresponding Ethernet Virtual Connections (EVCs), described below in detail.

While FIGS. 1-7 describe embodiments of architectures for frame relay to Ethernet interworking, other network configurations and interworking scenarios are possible. In each configuration, the interworking may include the mapping of service, traffic parameters, and quality of service (QoS) indications. With the architecture of the present invention described above with respect to FIGS. 1-7, the remainder of this document is arranged as follows. Ethernet services supported by the present invention are described next. Following Ethernet services is a description of frame relay services supported by the present invention. Service interworking functions for a single class of service arranged in accordance with the present invention follows. Finally, service interworking functions for multiple classes of service arranged in accordance with the present invention are described.

Ethernet Services

Ethernet services supported by the present invention can include well-defined classes with different levels of service, such as Gold, Silver, Bronze, having different frame loss, delay, and jitter guarantees. As used herein, an EVC is a collection of Ethernet frames that are classified and grouped together for the purpose of interworking with frame relay. EVC frames have a unique media access control (MAC) address, and a virtual id (VID) if the frames are VLAN aware. EVCs are bidirectional point-to-point connections which allow asymmetrical bandwidth profiles in the different directions. An EVC identifiable by a VID or port can support single or multiple services. This arrangement advantageously allows bandwidth to be defined on a per class of service (CoS) basis. An EVC can be based on the Ethernet port, the Ethernet port and the VID, MAC source and destination address pairs or the MAC source, destination address and VID. This of course, assumes that an EVC can not support more than one VLAN.

An EVC can be associated with one or more bandwidth profiles and with one or more forwarding treatment rules for its frames. From a quality of service (QoS) perspective, a single QoS EVC provides a single bandwidth profile and a single forwarding treatment for all frames within the EVC. A multiple CoS EVC provides a single bandwidth profile and multiple forwarding treatments for all frames within the EVC. A multiple QoS EVC provides multiple bandwidth profiles and multiple forwarding treatments for all frames within the EVC. The bandwidth profile is used for resource reservation and allocation, admission control and traffic policing and is a control plane function, described below in detail. The forwarding treatment indicates scheduling and discard treatment of the frame. Forwarding treatment is specified by the per hop behavior (PHB) assignments to the frame and is based on EVC type, and of OSI protocol Layer 1-7 fields. Forwarding treatment is a data plane function, described below in more detail. PHB is an indication of the forwarding treatment applied to a frame and indicates a frame per-hop scheduling class (PSC) and drop precedence (DP), where higher DP frames are discarded before lowed DP frames in a congestion condition. Also, as used herein, DP may also indicate a frame relay connection discard priority. Bandwidth profile and forwarding treatments are independent from one another in accordance with the present invention. Frames with different service classes can be combined with the same bandwidth profile or assigned to separate bandwidth profiles.

The IEEE 802.1Q tag in a tagged Ethernet service frame (see FIG. 2) includes p-bits in the frame header. These p-bits can be used to identify nodal behavior and determine the forwarding treatment received by the Ethernet frame. Such nodal behavior includes expedited forwarding, assured forwarding, and default forwarding. The present invention provides a number of options for supporting and identifying the Ethernet frame service class behavior, e.g. scheduling, drop precedence and expected performance.

As one option, Ethernet frame service class and drop precedence can be identified using Ethernet L2 indicators only. The most common fields are the p-bits, but other L2 indicators such as the CFI bit, source and destination MAC addresses and VLAN ID can be used. This option is suitable for pure Ethernet L2 networks, and has the advantage of being simple and independent from the ULP carried by the Ethernet frame.

As another option, the more general multi-field classification that spans any of the Layer 1 to Layer 7 protocol layers can be used, either individually or in combination. For example, if the frame is carrying IP traffic, this option can use the IP protocol information such as the protocol type, IP source and destination addresses, differentiated services code point and/or TCP/UDP port numbers.

As used herein, Ethernet per-hop-behavior (PHB) data is defined as the per-hop scheduling class (PSC) data plus the drop precedence data. Additional information regarding Ethernet PHBs can be found in the inventors' pending U.S. patent application Ser. No. 10/868,536, entitled ETHERNET DIFFERENTIATED SERVICES, the entirety of which is incorporated herein by reference. The basic principle is that each incoming Ethernet frame is assigned a PHB which specifies forwarding treatment of the frame by edge and core network nodes. Generally, PSC is synonymous with a service class or service, but it is contemplated that multiple PSCs can be combined into a single service class. If single service is supported, all frames are treated and mapped equally by the IWF, irrespective of the interface being VLAN-aware or VLAN-unaware and the presence/absence or encoding of the p-bits.

Alternatively, a single service per port/VID could be supported based on the VID or p-bits value on VLAN-aware interfaces (data plane function, controlled by the Control Plane rules). If multiple services are supported by the Ethernet connection, multiple traffic contracts/parameters may be specified independently for each service (traffic contracts can be used for traffic policing, resource reservation/admission control, and SLAs). In effect, each service can be treated independently like a separate sub-connection (control plane function).

Frame Relay Services

ITU X.36 defines frame relay virtual circuit (FVC) transfer and discard priorities. For frame relay, 16 transfer priority (TP) levels are defined. TP is defined per virtual circuit (VC) and for each direction. During data transfer a virtual circuit with a high transfer priority will have its frames serviced before frames of a virtual circuit with lower transfer priority. Additionally, eight discard priority (DP) levels are defined for a frame relay frame. Discard priority is defined per virtual circuit and for each direction. Frames with lower discard priority level will be discarded first upon network congestion before frames with higher discard priority levels. Frame transfer priority and discard priority are set at the subscription time or by signaling.

Frame relay services typically include well-defined classes, which can be used for supporting services such as gold, silver, bronze. Each service is distinguished with different frame loss, delay, and jitter parameters. A Standard frame relay Connection (DLCI) can only support a single service. The single service includes a two drop precedence that affects discard treatment, but not scheduling behavior. All frames belonging to a service must be delivered in order.

Existing standards such as the International Telecommunications Union (ITU) X.36 Standard defines transfer and discard priorities for frame relay virtual circuits. ITU X.36 defines sixteen transfer priority levels (per virtual circuit and for each direction), and eight discard priority levels (per virtual circuit and for each direction). Frame relay frame transfer and discard priorities are set at subscription time or by signaling.

Referring to FIG. 8, table 200 shows the frame relay service classes specified in the ITU X.146 Standard. Each class has different performance expectations. The performance expectations include network support 204, frame loss ratio 206, frame transfer delay 208, and frame delay variation 210. In general, frame relay standards support four service classes 202 (ITU-T X.146) differentiated by frame loss 206 and frame delay 210 expectations. In accordance with the present invention, Ethernet services should be mapped to an equivalent frame relay service. For example, an Ethernet service class should be mapped to a frame relay service class with the same performance expectations in terms of loss, delay, and jitter.

For example, an Ethernet premium service with frame loss ratio $<10^{-3}$, frame transfer delay <200 ms, and frame delay variation <50 ms can be mapped to frame relay class 3 service. Frame relay class 1 and class 2 services are not adequate since class 1 and class 2 services do not satisfy some of the performance objectives. For example, class 1 and class 2 services do not meet the required frame transfer delay 208 of <200 ms.

When single service is supported, all frames are treated/scheduled equally by the IWF. The treatment is determined by Control Plane rules, which may be configured or signaled based on the connection transfer priority (TP), discard priority (DP), and/or QoS class. Multiple services can be supported on a single frame relay connection, in a value-added non-standard manner. In this case, the frame CoS indicators are used to derive the frame PHB (according to Control Plane rules). The CoS indicators can be based on multi-field or behavior aggregate classification. The frame relay frame per-hop-behaviors may be based on the p-bits, CFI, and IP DSCP, individually or in combination. The per-hop-behaviors determination may alternately or additionally use the MAC address, IP addresses, IP protocol Type, TCP/UDP port number, or any other L1-L7 fields individually or in combination.

Service Interworking Functions

In accordance with the present invention, functions performed by an IWF include control plane functions and data plane functions. As noted above, control plane functions are based on configuration and/or signaling data. An exemplary control plane function is the connection mapping between an EVC and the frame relay data link connection(s) (DLC). Control plane functions also include bandwidth profile mapping between Ethernet and frame relay connections. Control plane functions also define the rules for the data plane functions, for example, the mapping/interpretation of the p-bits to the Ethernet PHB, congestion and discard eligibility mapping, etc.

Data plane functions are those that effect the treatment of the user frames and are typically implemented as real-time functions. Exemplary data plane functions including changing the protocol header between Ethernet and frame relay, forwarding the frame to the chosen connection/queue and scheduling the connection onto the outgoing link. By way of example, assume an EVC carries VID 5, with a single bandwidth profile. The Ethernet frames received are classified with gold, silver or bronze performance depending on the setting of the p-bits (or other Layer 1-Layer 7 classification as described above). The EVC is mapped to a frame relay DLC by the IWF or to multiple frame relay DLCs, depending on the network option. The CoS can be asymmetrical.

Single CoS

Figure 9A:
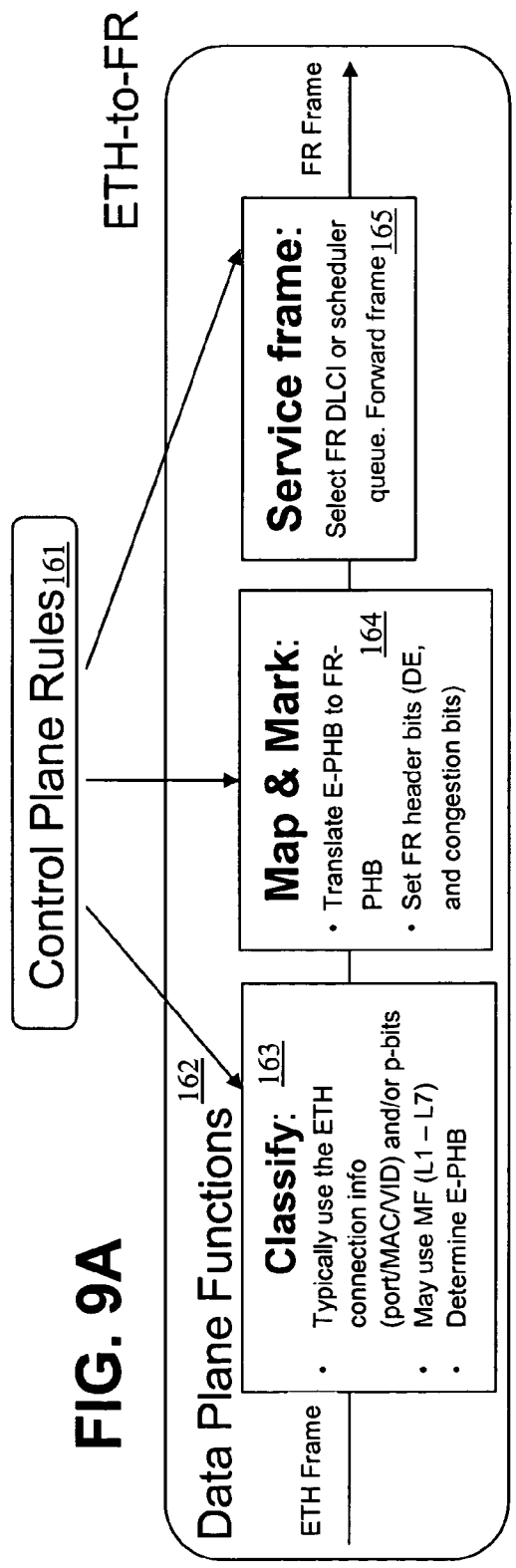
FIG. 9A is a block diagram of Ethernet to frame relay control plane rules and data plane functions.
Figure 9B:
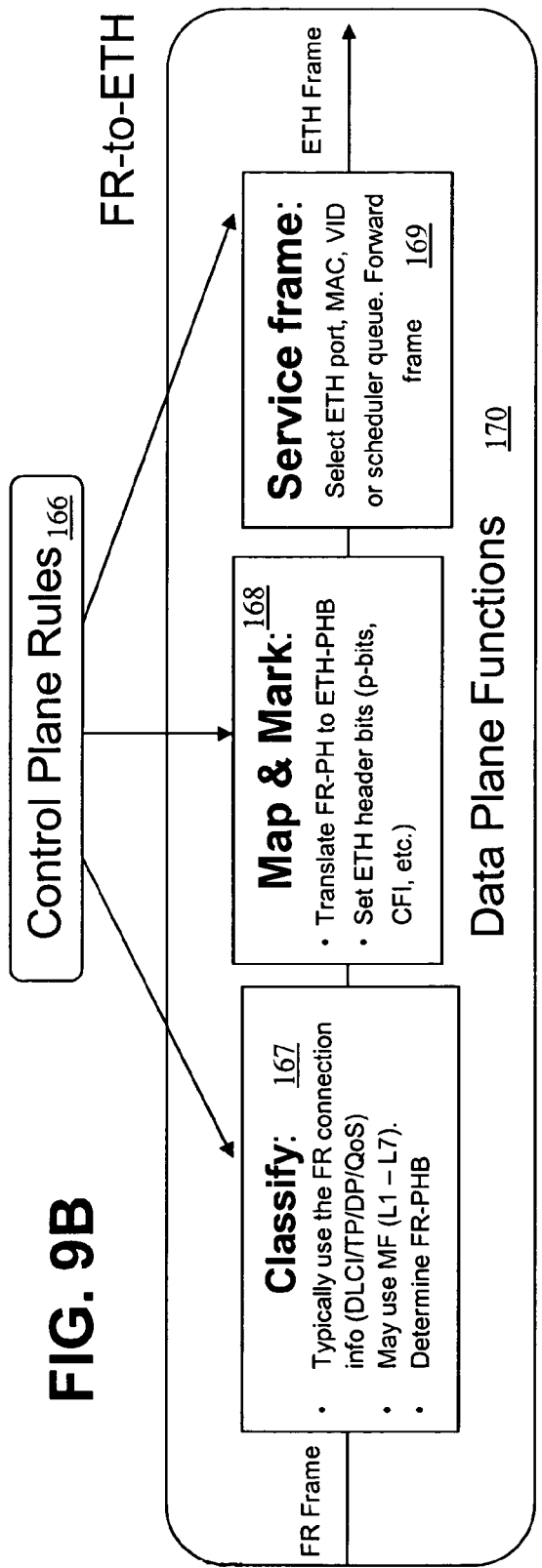
FIG. 9B is a block diagram of frame relay to Ethernet control plane rules and data plane functions.

Referring to FIGS. 9A and 9B, the IWF performs both control plane and data plane functions. For single CoS support, there is one-to-one mapping between a frame relay connection and an Ethernet virtual connection. An Ethernet virtual connection is identified by a port(interface)/MAC and/or VID. In the frame relay to Ethernet direction, DLCI is mapped to VLAN ID (VID). If Ethernet Q-tag identification is not employed, frame relay DLCI is mapped to an Ethernet interface/port and/or MAC destination address specified by configuration. In the Ethernet to frame relay direction, VID is mapped to DLCI. If Ethernet Q-tag identification is not employed, Ethernet frames arriving on a particular Ethernet interface/port and/or from a specific MAC source address are mapped to a single DLCI.

The IWF also performs class of service mapping. The class of service mapping functions ensure that the IWF meets the QoS/service objectives. For example, a gold Ethernet service/frame is mapped to an equivalent service on the frame relay side and vice versa. The mapping rules may be signaled and/or configured, for indicating the QoS level for the Ethernet-to-frame relay connection, and the required mapping. This mapping sets the operation/data control functions of the IWF during frame processing.

As is shown in FIGS. 9A and 9B, an IWF uses both data plane functions 162 and 170 and control plane functions as described by control plane rules 161 and 166 to service a frame between an Ethernet network and a frame relay network. The data plane functions include classification (e.g., 163 and 167), mapping and marking (e.g., 164 and 168), and servicing of the frame (e.g., 165 and 169). The exact functions performed by the IWF for each of these steps can vary. Control plane rules specify the functionality.

In the Ethernet to frame relay direction (FIG. 9A), Control plane rules 161 describe the classification 163, mapping/marking 164, and servicing 165 of the frame. The classification 163 includes the use of the Ethernet connection information (e.g., port, MAC, VID) and/or the p-bits in the Ethernet header. During the classification process, the IWF determines the Ethernet per-hop-behavior for the frame. Subsequent to the classification of the frame, the frame is mapped and marked. Mapping and marking can include translating the Ethernet per-hop-behaviors to frame relay per-hop-behaviors and setting frame relay header bits, for example, setting the discard eligibility and the congestion bits. Subsequent to the mapping and marking of the frame, the IWF services the frame. Servicing 165 includes selecting the frame relay DLCI or queue and forwarding the frame based on the selection.

In the case of a single CoS, the IWF complements the Metro Ethernet Network (MEN) data plane and control plane functions. The MEN data plane functions may perform frame classification, metering and marking, and assign an EVC-ID and a Class-of-service ID/PHB to the Ethernet frame. The IWF maps the EVC-ID to the Frame relay DLCI, maps the drop precedence and congestion indications (CI) from Ethernet to frame relay, encapsulates the frame for frame relay transport and forwards the frame onto the frame relay connection/link. Accordingly, control plane functions for EVC mapping include mapping the EVC and its bandwidth profile to the corresponding frame relay connection that best meets the EVC performance objectives.

In the frame relay to Ethernet direction (FIG. 9B), Control plane rules 166 describe the classification 167, mapping/marking 168, and servicing 169 of the frame. The classification 167 includes the use of the frame relay connection information (e.g., DLCI, TP, DP, QoS). The classification may also be based on multiple functions such as Layer 1 to Layer 7. During the classification process, the IWF determines the frame relay per-hop-behavior for the frame. Subsequent to the classification of the frame, the frame is mapped and marked. Mapping and marking can include translating the frame relay per-hop-behaviors to Ethernet per-hop-behaviors and setting Ethernet header bits, for example, setting the p-bits and CFI. Subsequent to the mapping and marking of the frame, the IWF services the frame. Servicing 169 includes selecting the Ethernet port, MAC, VID, or scheduler queue and forwarding the frame based on the selection.

In the case of a single per-hop scheduling class (PSC)/service class, the IWF maps the FR DLCI to the EVC-ID, maps the drop precedence and congestion indicators (CI) from frame relay to Ethernet, encapsulates the frame for transmission over Ethernet and forwards the frame onto the Ethernet connection/link. Accordingly, control plane functions include mapping the frame relay DLCI and its bandwidth information to the corresponding EVC that best meets the performance objectives and the service class of the frame.

Figure 10:
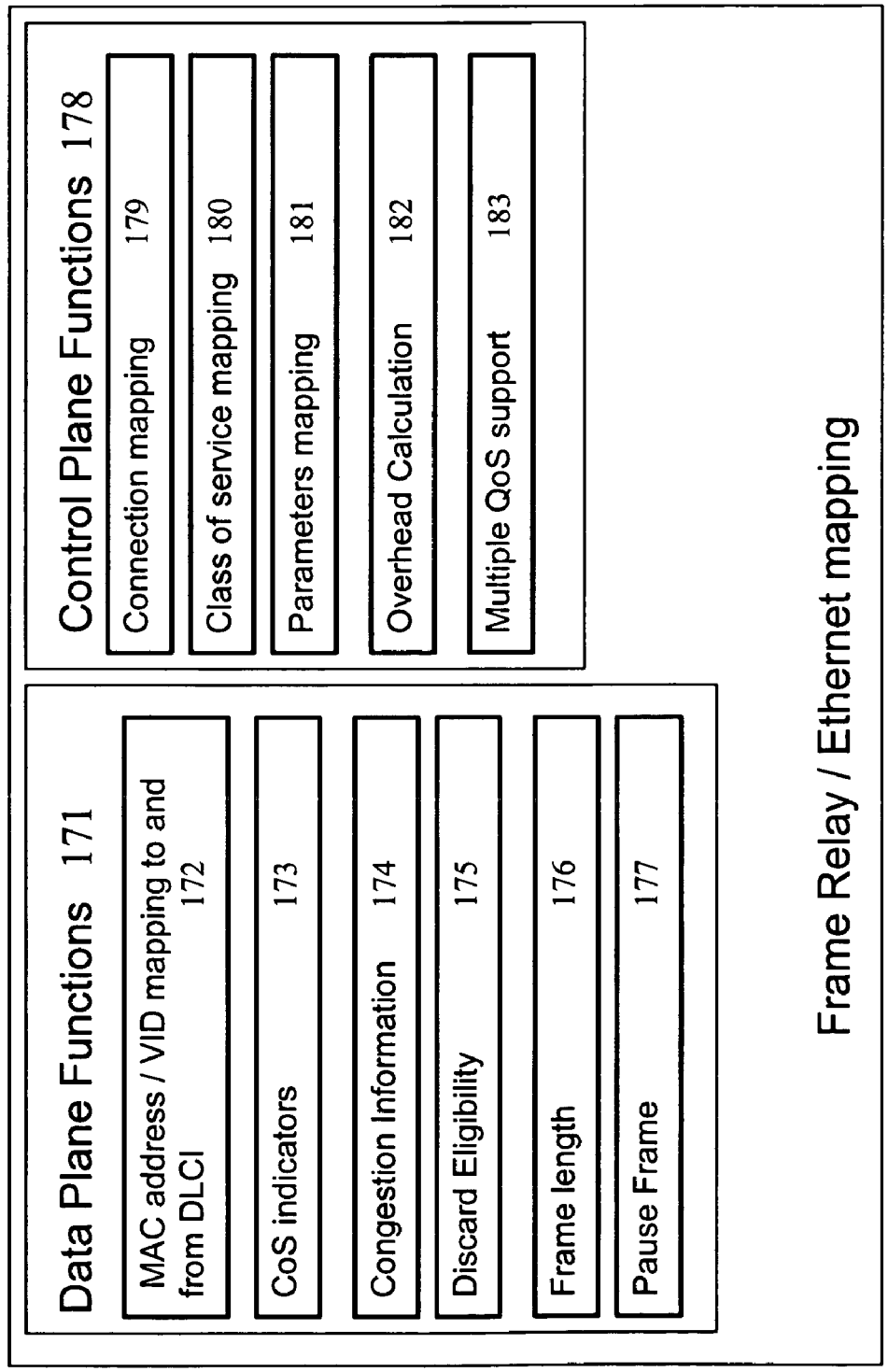
FIG. 10 is a block diagram of frame relay to Ethernet mapping parameters.

Referring to FIG. 10, service interworking between an Ethernet network and a frame relay network can include mapping multiple functions in both the control plane and the data plane. The control plane functions 178 use configuration and/or signaling information that typically take place before any traffic is sent, and applies to all/many frames of a particular flow/connection. The control plane functions 178 support various CoS functions, connection mapping 179, service class mapping 180, parameters mapping 181 and overhead calculation 182. Support for multiple CoS 183 is discussed below in detail.

With respect to connection mapping, for single CoS support, there is a one-to-one mapping between a frame relation connection and an Ethernet virtual connection. Taking the Ethernet to frame relay direction first, for VLAN aware interfaces, the VID is mapped to a DLCI. For VLAN unaware interfaces, Ethernet frames arriving on a particular port and/or with a specific MAC source and destination address are mapped to the frame relay DLCI.

With respect to service class mapping (class of service mapping function 180) for a single CoS connection, the present invention supports mapping between ETH EVC and FR DLC service classes. Service class mapping is performed to ensure that the IWF meets the service class objectives. For example, a gold Ethernet service should be mapped to an equivalent service on the frame relay side and vice versa. Alternate mappings are permitted to allow for cases where the Ethernet and frame relay service classes do not match. Service class mapping sets the data plane functions of the IWF during frame processing. An example of service class mapping is provided above.

Figure 11:
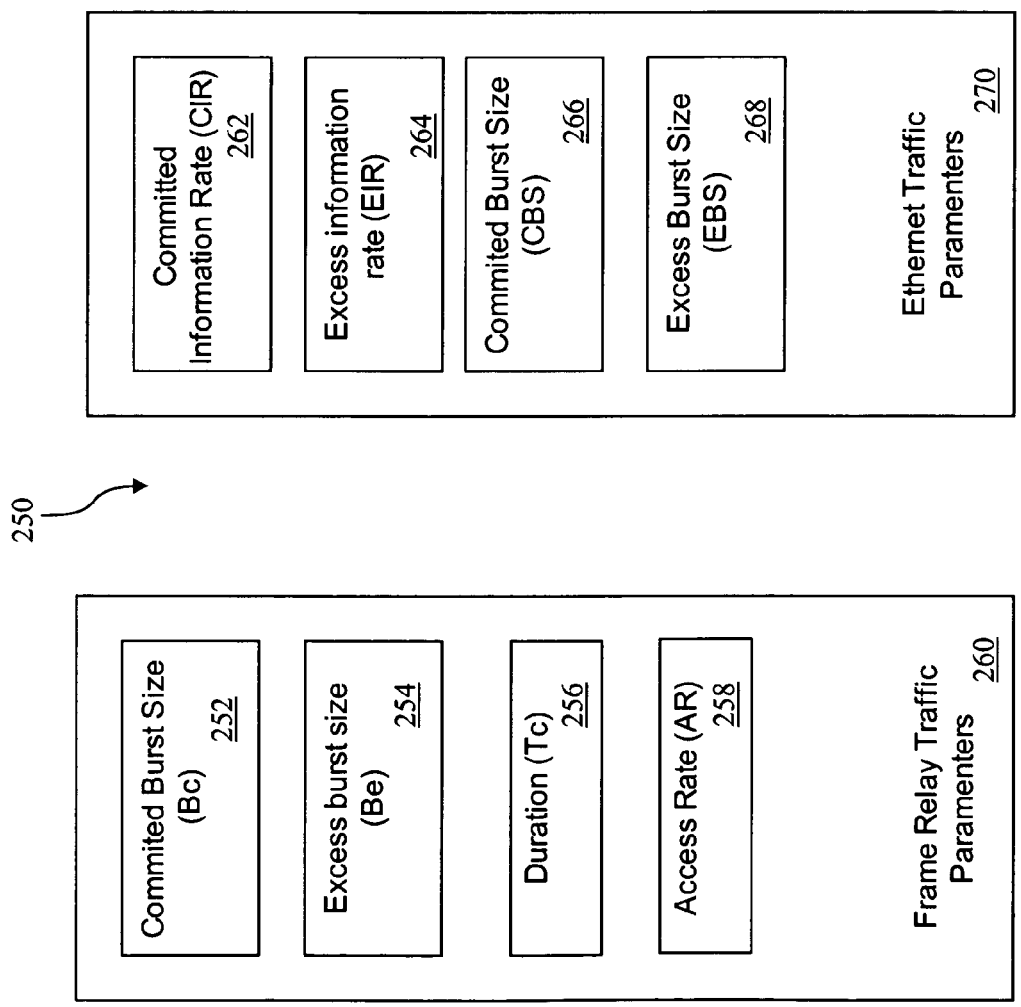
FIG. 11 is a block diagram of frame relay and Metro Ethernet Forum traffic parameters.

Traffic parameters mapping is discussed with reference to FIGS. 11-14. Referring to FIG. 11, a set of frame relay traffic parameters 260 and a set of Ethernet traffic parameters 270 are shown. Traffic parameters are used by many QoS functions: traffic policing and monitoring, BW reservation, admission control, and scheduler configuration.

The standard frame relay traffic parameters include committed burst size ($B_c$) in bits, excess burst size ($B_e$) 254 in bits, Duration ($T_c$) 256 in seconds, and access rate (AR) 258 in bits per second. At any time interval of duration $T_c$ 256, the frame relay end user is allowed to transmit frames at the $A_R$ 258 up to its contracted $B_c$ 252 and $B_e$ 254 amount of information. Frame relay service rates including the committed information rate ($CIR_F$) and excess information rate ($EIR_F$) are derived from $B_c$, $B_e$, and $T_c$ as: $CIR_F=B_c/T_c$ and $EIR_F=B_e/T_c$.

Ethernet traffic parameters 270 can be based on the Metro Ethernet Forum Standard. The Ethernet traffic parameters 270 include committed information rate ($CIR_E$) 262 in bits per second, excess information rate ($EIR_E$) 264 in bits per second, committed burst size (CBS) 266 in bits, and excess burst size (EBS) 268 in bits. Other units may be used such as bytes/octets.

The four Ethernet parameters described above are set independently.

Referring to FIG. 12, when a mapping function is set between a frame relay and an Ethernet connection, the IWF device calculates the traffic parameters. For example, in the frame relay to Ethernet direction (shown in FIG. 11 table 250), the parameters 270 for the Ethernet network can be calculated using the frame relay traffic parameters 260. As used herein, the subscript "$_E$" in conjunction with the below-listed values refers to values on the Ethernet side of the IWF and the subscript "$_F$" refers to the frame relay side. In a first mapping (shown in box 274), $CBS=B_c$, $EBS=B_e$, and $CBS/CIR_E=EBS/EIR_E=T_c$. In a second mapping (shown in box 276), $CIR_E=Bc/Tc$, $CBS=B_c$, $EIR_E=AR-CIR_E$, $EBS=EIR_E*T_c$.

In the Ethernet to frame relay direction, the parameters for the frame relay network 260 can be calculated using the Ethernet traffic parameters 270 (shown in table 278). In a first example (shown in box 280) $B_c=CBS$, $CIR_F=CIR_E$, $EIR_F=EIR_E$. This assignment emphasizes the values of committed rate parameters ($CIR_F$, $B_c$), and $EIR_F$ as the main frame relay parameters. In a second example (shown in box 282) $B_c=CBS$, $CIRF=CIR_E$, $B_e=EBS$. This assignment emphasizes the values of committed rate parameters ($CIR_F$, $B_c$), and $B_e$ as the main frame relay parameters. In a third example (shown in box 284) $B_c=CBS$, $B_e=EBS$, $T_c=(CBS+EBS)/(CIR_E+EIR_E)$. The choice for the Tc mapping is based on the need to limit the amount of information entering frame relay network to CBS+EBS over a period of time having a length $T_c$. This would be in agreement with frame relay specification even though $CBS/CIR_E$ and $EBS/EIR_E$ are not strictly equal. In the above options (280, 282, and 284), the AR is set to the rate of the physical link. Many existing devices use the older RFC 2698 traffic parameters for specifying the traffic profiles and policing the user for conformance.

Referring to FIG. 13, a set of frame relay traffic parameters 260 (as described above) and a set of RFC 2698-based Ethernet traffic parameters 302 are shown.

RFC 2698-based Ethernet traffic parameters 302 include peak information rate (PIR) 294, committed information rate ($CIR_E$) 296, peak burst size (PBS) 298, and committed burst size (CBS) 300. The four RFC 2698-based Ethernet parameters are set independently.

Referring to FIG. 14, when a frame is forwarded between a frame relay network and an RFC 2698 Ethernet network the traffic parameters are calculated. For example, in the frame relay to Ethernet direction (shown in table 304), the parameters 302 for the Ethernet network can be calculated using the frame relay traffic parameters 260. In a first mapping (shown in box 306), $PIR=(B_c+B_e)/T_c$, $CIR_E=B_c/T_c$, $CBS=B_c$, and $PBS=B_c+B_e$. In a second mapping (shown in box 308), $PIR=AR$, $CIRE=B_c/T_c$, $CBS=B_c$, allowed $EIR_F=AR-CIR$, allowed $B_e=\infty$.

In the Ethernet to frame relay direction, the parameters for the frame relay network 260 can be calculated using the Ethernet traffic parameters 302 (shown in table 310). In a first example (shown in box 312) when PBS>CBS, $CIRF=CIR_E$, $B_c=CBS$, and $EIR_F=PIR-CIR$. This assignment emphasizes the values of committed rate parameters ($CIR_F$, $B_c$), and EIRF as the main frame relay parameters. In a second example (shown in box 314) when PBS>CBS, $CIR_F=CIR_E$, $B_c=CB_S$, and $B_e=PBS-CBS$. This assignment emphasizes the values of committed rate parameters ($CIR_F$, $B_c$), and $B_e$ as the main frame relay parameters. In a third example (shown in box 316) PBS<CBS, $CIR_F=CIR_E$, $B_c=CBS$, and $EIR_F=PIR-CIR$. This assignment emphasizes the values of committed rate parameters ($CIR_F$, $B_c$), and $EIR_F$ as the main frame relay parameters. In the above options (312, 314, and 316), the AR is set to the rate of the physical link.

Overhead calculation function 182 (in FIG. 10) is discussed. Referring back to FIG. 2, the Ethernet frame format 42 includes more overhead compared to that of the frame relay frame 40. The frame relay header includes fields in the frame relay frame other than the data field. Excluding the flags, the frame relay header length ($H_F$) is 4, 5 or 6 bytes depending on the frame relay address length. Excluding the preamble and the SFD, the Ethernet header length ($h_E$) is 22 bytes for VLAN-aware interfaces or 18 bytes for VLAN-unaware. A correction factor maps rates between Ethernet and frame relay networks.

The value of the correction factor depends on the length of the data field. For data field of length 'n' bytes and assuming no fragmentation, the correction factor, 'a' is equal to $(n+h_E)/(n+h_F)$. Based on this correction factor in the frame relay to Ethernet direction $CIR_E=a*CIR_F$ and $EIR_E=a*EIR_F$. In the Ethernet to frame relay direction $CIR_F=CIR_E/a$ and $EIR_F=EIR_E/a$. The method is described for the Transparent IW mode. When the Translation mode is used, the overhead associated with the different encapsulation protocols must be considered as per the applicable Standard. The calculations are carried out in control plane (per connection), not for every frame. They are typically done in SW however they could also be completed by hardware configured to perform the appropriate functions.

Referring again to FIG. 10, data plane functions 171 include examining and mapping/setting the frame header information, forwarding the frame through the network, possible frame discard, and the like. The data plane functions are performed on every frame, typically in real-time. The control plane rules impact/configure the data plane functions 171, and are typically changed infrequently in non-real-time. The data plane functions can include, for example, MAC Address/VID mapping to/from DLCI 172, CoS indicators 173, congestion information 174, discard eligibility 175, frame length 176, and a pause frame 177.

With respect to MAC address/VID mapping function 172, referring back to FIG. 1B, interworking device 28 provides connection identification for frames sent from Ethernet network 26 to frame relay network 30 and vice versa. For single CoS support, there is one-to-one mapping between a frame relay connection and an Ethernet connection. For frames traveling from the frame relay network 30 to the Ethernet network 26, DLCI is mapped to VLAN ID (VID) or a p-bits value. If an Ethernet tag is not employed, frame relay DLCI is mapped to an Ethernet interface/port specified by the configuration. For frames traveling from the Ethernet network 26 to the frame relay network 30, VID (or p-bits value) is mapped to DLCI. If an Ethernet tag is not employed, Ethernet frames arriving on a particular Ethernet interface/port are mapped to a single DLCI.

The Ethernet media access control (MAC) addresses are also mapped for frames delivered between the two types of networks. The source address (SA) and destination address (DA) in the media access control header may be determined by configuration, or automatically assigned/discovered by the network.

For frames traveling from the frame relay network 30 to the Ethernet network 26, MAC source address may be set as the Ethernet interface address directly connected to the IWF. Alternatively, the IWF can dynamically assign an Ethernet address (which could change over a reset). The destination MAC address can be set by configuration based on the DLCI value in the frame relay header. Alternatively, if the L3 payload is IP, the media access control destination address could be discovered. In that case, the IWF would determine the binding of the IP and media access control addresses on the Ethernet side, and an inverse address resolution protocol (invARP) query can be sent by the frame relay device (e.g., CE Router) to the IWF. The invARP protocol request response returns the Ethernet customer edge router IP address.

For frames traveling from the Ethernet network 26 to the frame relay network 30, there is no mapping of the MAC source address by the IWF 28. If the payload is IP, the Ethernet device (CE Router) can determine the IP address using an address resolution protocol (ARP) request (the IP address at the other end of the frame relay DLCI) and will expect a MAC (the MAC address of the Interworking function) address back in an ARP response, which it then places in the source Ethernet frame. The frame relay DCLI value could be restored based on configuration, or automatically discovered, for example by using ARP and inverse ARP and the CE router IP address.

Figure 15:
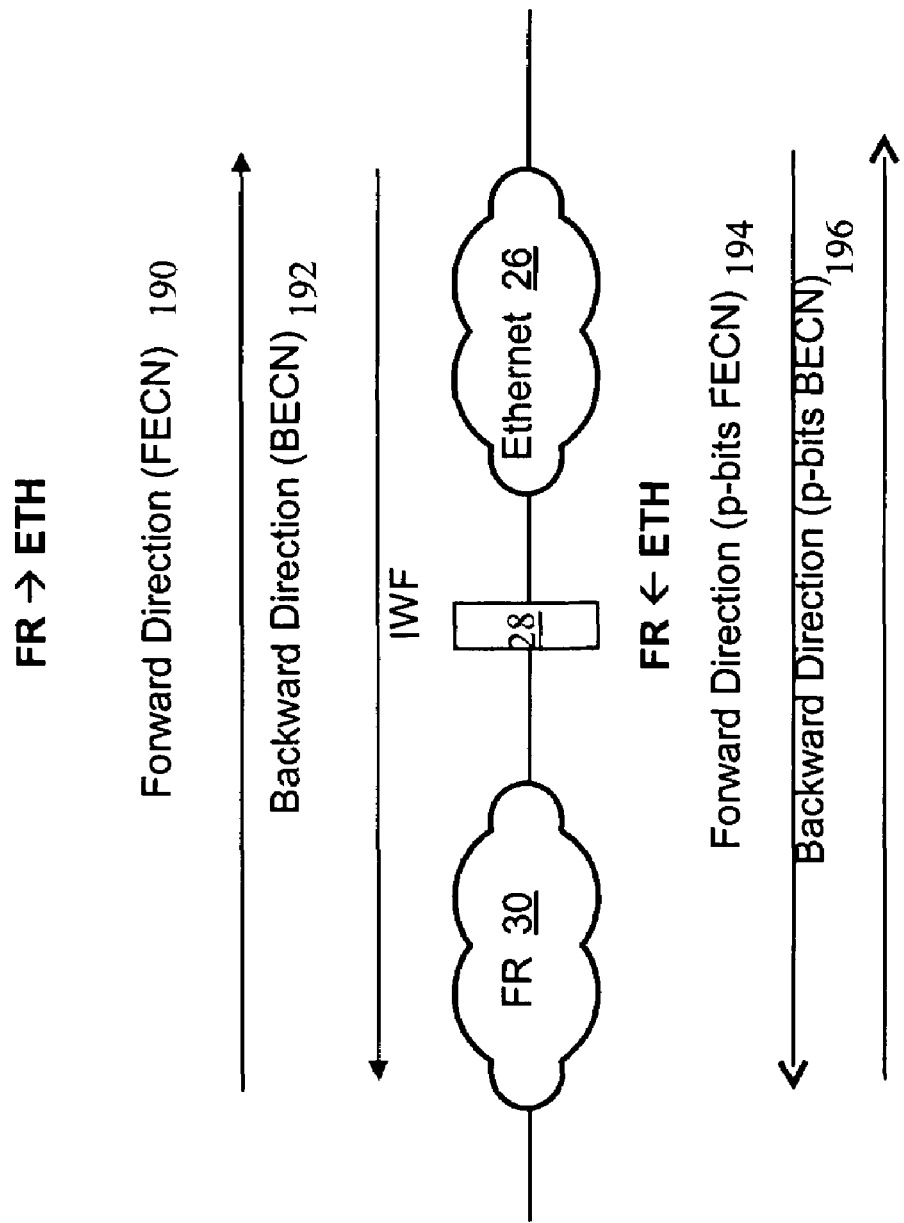
FIG. 15 is a block diagram showing congestion indications.

Referring to FIG. 15, a frame can include congestion indication options via congestion information function 174. Frame relay frames include forward explicit congestion notification (FECN) and backward explicit congestion notification (BECN) indications in the header. In a frame relay network, FECN is a header bit that may be set by a network device to indicate congestion in the source-to-destination forward direction. The destination device/receiver may then notify the sender to reduce its traffic rate to alleviate network congestion. BECN (backward explicit congestion notification) is a header bit that may be set by a network device to indicate congestion in the reverse destination-to-source backward direction. The destination device/receiver may then reduce its traffic rate to alleviate network congestion. FECN and BECN are intended to minimize the possibility that frames will be discarded (and possibly have to be resent) when a greater number of packets than can be handled travel through the network.

FECN and BECN indication mapping between the frame relay network 30 and the Ethernet network 26 can be carried out, if the priority bits (p-bits) in a tagged Ethernet frame are assigned for carrying congestion information. Alternately or in addition, the congestion indication can be specified by the CFI field.

In the frame relay to Ethernet direction, multiple options exist for mapping the FECN and BECN bits. In a first option for mapping the FECN bits in the frame relay frame to the Ethernet frame, the FECN field is mapped to a combination of p-bits that indicate the forward congestion. In a second option, the FECN indication in the frame relay frame is not mapped to the Ethernet frame. For example, the FECN value is neglected. This can occur when tagged Ethernet frames are not used. The FECN field can be mapped by the IWF to the BECN field in the frames traveling in the Ethernet to frame relay direction. Two options for mapping of the BECN bits include either ignore the BECN bits, or set p-bit BECN value in Ethernet frame, if supported by the p-bits.

In the Ethernet to frame relay direction, multiple options exist for mapping the FECN and BECN bits. In a first option for mapping the FECN bits, the forward congestion indication represented by a particular p-bits value is mapped to FECN bit in the Frame relay header. In a second option, the FECN bit is set to a fixed value determined by the network configuration. Two options for mapping of the BECN bits include mapping the backward congestion indication as represented by the p-bits value to BECN bit in the frame relay header or the BECN bit can be set to a fixed value determined by the network configuration.

Referring back to FIG. 10, discard eligibility function 175 indicates frames to discard when the network is congested. Recall that the Ethernet PHB may indicate frame discard treatment. As another option, discard eligibility mapping can be restricted to tagged Ethernet frames which use the p-bits and/or the Ethernet CFI field. Although this option is more limited than use of the Ethernet PHB, it is simpler to implement, especially in the case where the incoming Ethernet frames do not use/support rich classification functions. Also, this option is independent of the ULP.

The discard eligibility indication is a measure of the frame importance within a service/flow. The frame can be marked by the user, or set by the network policies based on the traffic contract and user sending rate. Discard eligibility can be mapped frame the frame relay frame to the Ethernet frame if discard eligibility is available on the Ethernet side. Discard eligibility on an Ethernet network can be included in p-bits or an equivalent mechanism such as the CFI field.

In the frame relay to Ethernet direction, the discard eligibility bit can be mapped to one of the eight p-bits combinations, depending on Ethernet service definition (as described in "ETHERNET DIFFERENTIATED SERVICES" by Sameh Rabie, et. al U.S. patent application Ser. No. 10/868, 536). Alternately, Ethernet frame discard eligibility (using p-bits) can be set to a constant indication based on a level of service for a particular provider configured at the time of subscription to the service.

In the Ethernet to frame relay direction, discard eligibility mapping is applicable if tagged Ethernet frames include p-bits for discard eligibility indication. As one option, the Ethernet frame drop precedence is mapped to frame relay discard eligibility. The PHB can indicate up to three drop precedences/colors. Metro Ethernet forum describes Ethernet frames as having a level of service indicated by a particular color. For example, green indicating conformant, yellow indicating excess, and red indicating traffic contract violation. The behaviors associated with the different colors can be mapped to particular discard eligibilities in the frame relay frame. For example, for green Ethernet frames the IWF sets discard eligibility in frame relay header to '0' and for yellow Ethernet frames the IWF sets discard eligibility in frame relay header to '1'. Red frames are optionally dropped by the IWF or forwarded to the network with discard eligibility in frame relay header set to '1'. As another option, the IWF sets discard eligibility in the FR header to a constant value (either '0' or '1') configured at service subscription time.

Another mappable data plane function shown in FIG. 10 is the frame length function 176. Frame length can also impact the forwarding treatment for the frame. The data field of the IEEE 802.3 frames is limited to 1518 bytes. 'Jumbo' frames can be larger than 1518 bytes on non-VLAN-aware interfaces and can be larger than 1522 bytes on VLAN-aware interfaces. Typically, jumbo frame can be up to approximately 9 K bytes. The IWF device drops frame relay frames that exceed the maximum supported Ethernet length in the frame relay to Ethernet direction. In the other direction, frame relay Standards specify Max MTU as 8 K bytes, but different implementations and interfaces may support different values. For example, low-speed interfaces carrying multi-media traffic may have a smaller value. If Ethernet frame size exceeds the frame relay MTU and fragmentation is supported the IWF device fragments the frame, for example according to the FRF.12 standard. If the size of an Ethernet frame exceeds the frame relay MTU and fragmentation is not supported, the IWF drops the frame.

Figure 16:
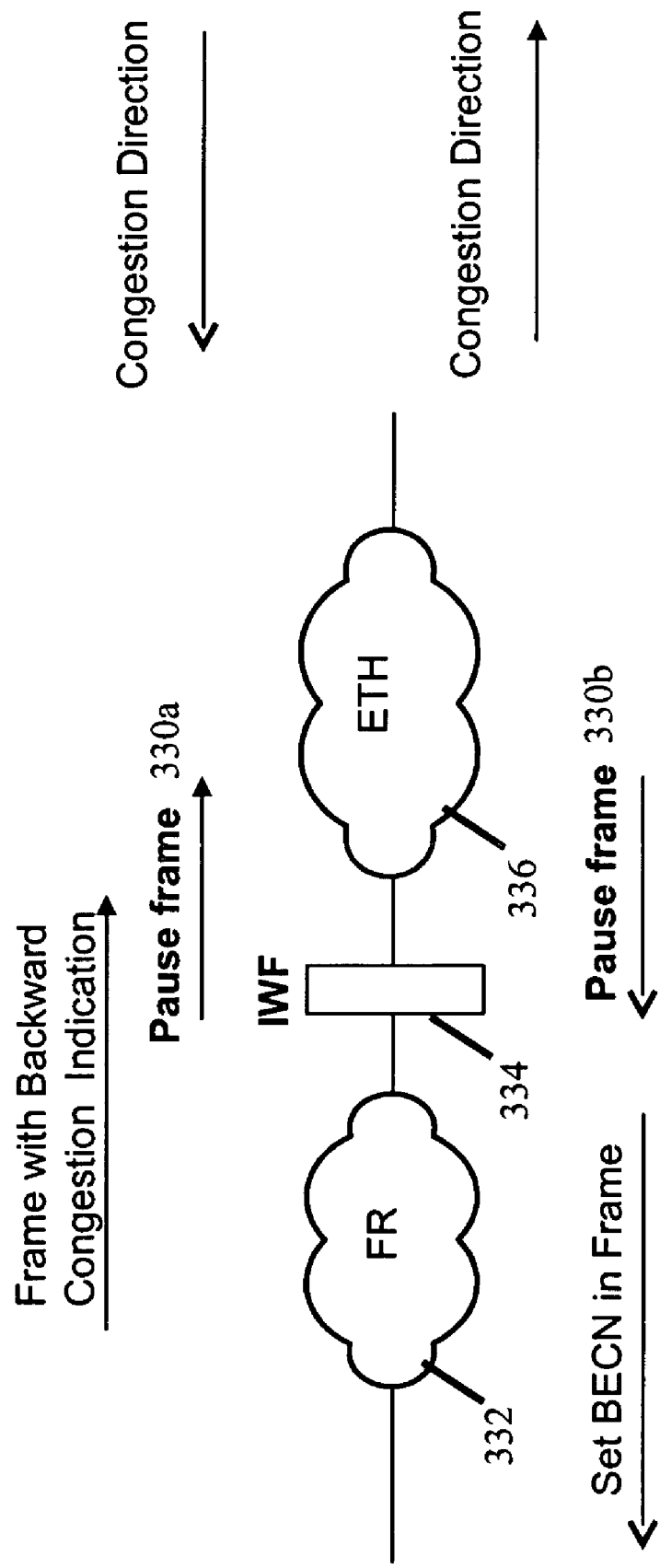
FIG. 16 is a block diagram of a network including the use of a pause frame.

Data plane functions also include a pause frame function 177 as shown in FIG. 10. Pause frame function 177 as used in service interworking in accordance with the present invention is described with reference to FIG. 16. The use of a pause frame allows flow control of traffic away from the frame relay core network. The pause frame stops all traffic on the device port, not on individual VLANs and is not CoS sensitive. Accordingly, pause frame function 177 is most useful for port mode Ethernet to frame relay interworking. Dropping frames at edge can increase the efficiency of the frame relay network because traffic is discarded at edge of the frame relay network instead of in the frame relay core.

If congestion exists in Ethernet to frame relay direction, the IWF allows dropping of frames at the edge of the network. The IWF 334 receives a frame relay BECN indication from the frame relay network 332. Subsequently, the IWF 334 sends a 'pause' frame 330a to Ethernet device. The pause frame requests the Ethernet device to stop sending frames to the frame relay network 332.

If the network is congested in the frame relay to Ethernet direction, the IWF 334 receives a pause frame 330b from the Ethernet device 336 and maps the pause frame 330b to set the BECN bit in the frames traveling in the ETH-to-frame relay direction. The present invention contemplates an enhanced pause frame that can stop all traffic on the port or on individual VLANs. The enhanced pause frame can either be QoS sensitive or QoS may not impact the pause frame functionality.

Multiple Classes of Service

Unlike FR, a single Ethernet VLAN can support multiple CoS classes, for example premium, gold, and standard classes of services. Each class of service is identified by assigning a unique p-bit value to service frames. The EVC can be assigned a single bandwidth profile for the aggregate bandwidth for the whole EVC or be assigned multiple bandwidth profiles, i.e. a bandwidth profile for each service class or group of classes.

In the Ethernet to frame relay direction, each class of service is assigned a separate frame relay DLCI based on the Ethernet interface, VLAN-ID, and/or p-bits value, a subset of the service classes can be mapped to a single frame relay DLCI based on Ethernet CoS indicators, or all service classes are mapped to a single frame relay DLCI with Ethernet or IP awareness. In the above options service and parameter mappings follow the same rules as described above.

In the frame relay to Ethernet direction, on VLAN-aware interfaces, the VLAN ID (VID) is recovered from the DLCI value, otherwise the Ethernet interface value is determined. On Q-tagged interfaces, the p-bits value is recovered from the frame relay DLCI class of service. For one-to-one mapping between class of service and DLCI, mapping of the service parameters follows the same rules described before. For multiple classes of service mapping to a single DLCI, the original service parameters are not recovered. Alternatively Upper Layer Protocol information may be used, such as IP Differentiated Services.

The IWF is arranged to support the various multiple CoS options for the EVC and match them to the frame relay transport capabilities. The following describes extensions to the control and data plane functions described above as applied for supporting multiple CoS EVCs.

In the Ethernet to frame relay direction for the multiple CoS case, the Ethernet CoS indicators are used to indicate the frame service class. The IWF data plane functions perform service class mapping in addition to all of the single CoS mapping functions described above (see FIG. 10). The control plane functions can include mapping of the EVC and its bandwidth profile(s) to the corresponding frame relay connection(s) and their parameters. The arrangement for the frame relay to Ethernet direction is similar.

Figure 17A:
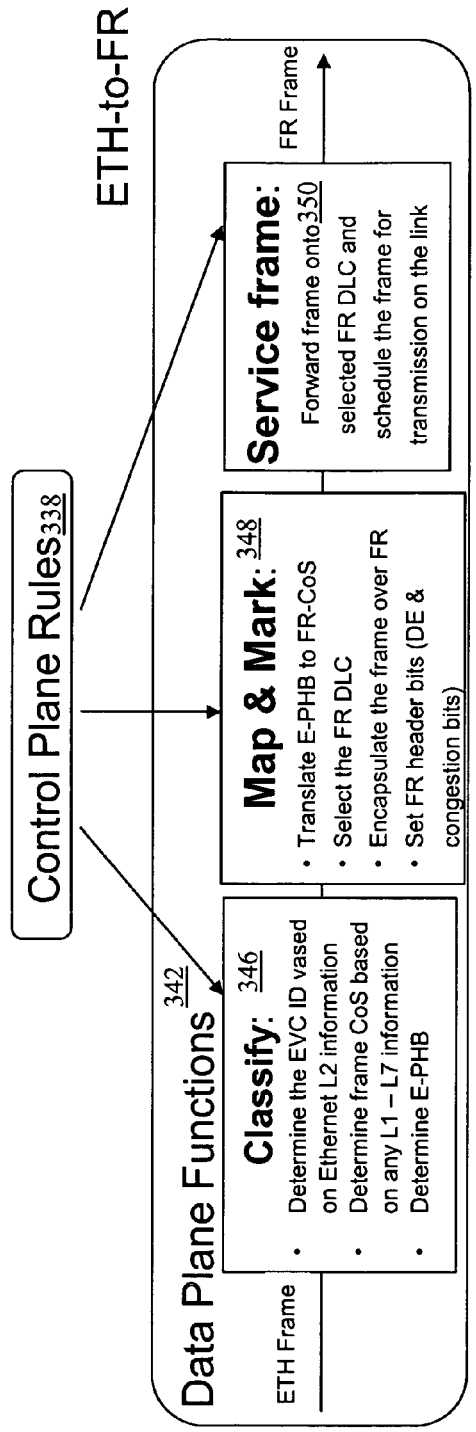
FIG. 17A is a diagram showing an exemplary typical service interworking process for multiple CoS implementations for frames being transported from an Ethernet network to a frame relay network.
Figure 17B:
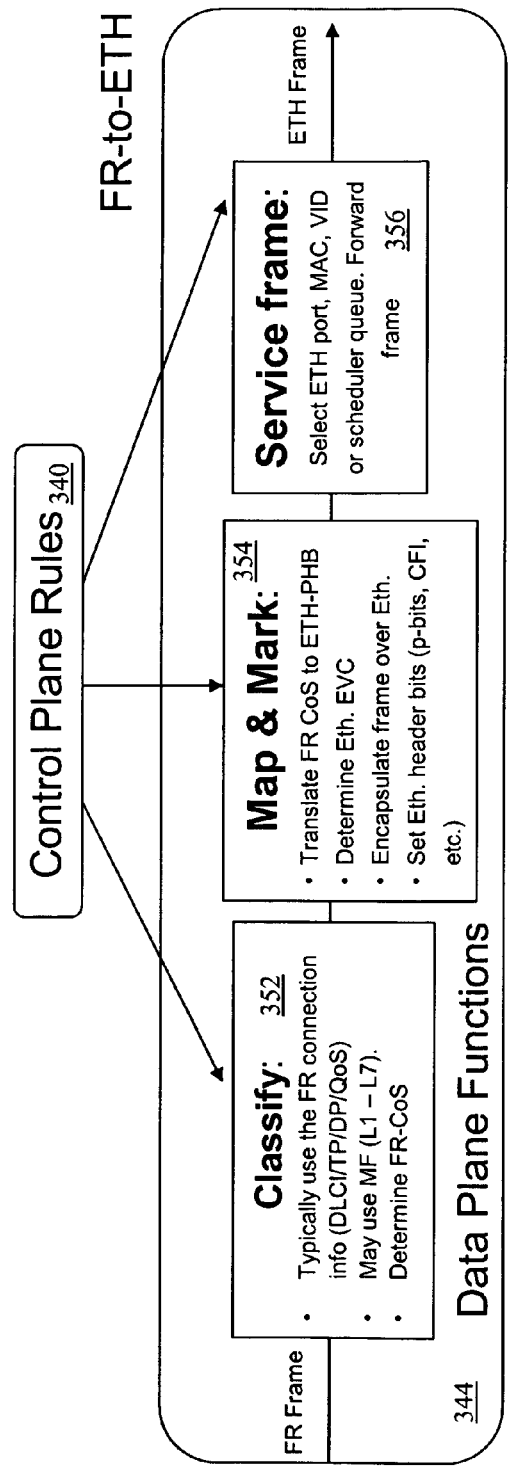
FIG. 17B is a diagram showing an exemplary typical service interworking process for multiple CoS implementations for frames being transported from a frame relay network to an Ethernet network.

FIGS. 17A and B are diagrams showing an exemplary typical service interworking process for multiple CoS implementations. As shown in FIGS. 17A and B, control plane rules 338 and 340 in the IWF control data plane functions 342 and 344 in the Ethernet to frame relay and frame relay to Ethernet directions, respectively. In the Ethernet to frame relay direction, when an Ethernet frame arrives at the IWF, the Ethernet frame is classified 346 to (1) determine the EVC ID based on the L2 Ethernet information, (2) determine the frame CoS based on any Layer 1-7 information and (3) determine the Ethernet PHB.

The Ethernet frame is mapped and marked 348 to (1) translate the Ethernet PHB to a frame relay CoS, (2) select a frame relay DLC, (3) encapsulate the frame into a frame relay frame and (4) set the frame relay header bits, e.g. the DE and congestion bits. The marked and mapped frame is then serviced 350 to forward the frame onto the selected frame relay DLC and to schedule the frame for transmission on the frame relay link.

In sum, when multiple frame relay DLCs are supported, the Ethernet frame service class is used to select the outgoing frame relay DLC in the Ethernet to frame relay direction. In the Ethernet to frame relay direction, the control plane rules 338 are used to determine (1) how the Ethernet frame service class will be gathered, (2) the mapping rules from the Ethernet to frame relay service classes and (3) the service classes associated with each frame relay DLC. The incoming frame is processed to determine the Ethernet frame service class, map the Ethernet service class to the nearest frame relay service class and forward the frame onto the frame relay DLC that supports the mapped frame relay service class.

In the frame relay to Ethernet direction, the frame relay frame is received by the IWF and classified 352 using frame relay connection information (which may include the TP, DP and/or service class). The frame L1-L7 protocol information may also be used. The frame CoS is determined. The classified frame is mapped and marked 354 to (1) translate the frame relay CoS to an Ethernet PHB, (2) determine the Ethernet EVC, (3) encapsulate the frame into an Ethernet frame and (4) set the Ethernet header bits such as the VID, p-bits, CFI, etc. The mapped and marked frame is serviced 356 to forward the frame onto the selected port/VLAN and schedule the frame for transmission on the Ethernet link. Because some CoS indicators may not be present in the frame relay frame, mapping may not be symmetrical.

With reference to FIG. 10, connection mapping function 179 for multiple CoS applications is described. For Ethernet EVC mapping to frame relay, the EVC can be mapped to frame relay using different methods depending on the extent of EVC CoS support, the frame relay network capability and available CoS options. These options include (1) using a single legacy frame relay DLC with a single CoS in the frame relay core, (2) using multiple legacy frame relay DLCs to support multiple CoS, e.g. gold, silver and/or bronze DLCs, and (3) using a single multi-CoS frame relay DLC that is capable of supporting multiple CoS based on frame CoS indication such as the Ethernet P-bits or IP differentiated services.

Similar mapping can be implemented in the frame relay to Ethernet direction. One or multiple frame relay DLCs can be mapped to an Ethernet EVC. Parameter mappings depend on the number/CoS of the frame relay DLCs and the EVC bandwidth parameter options. Based on these combinations, the FR DLC traffic may be aggregated or partitioned to the corresponding EVC traffic parameter sets. Parameter mappings are carried out for independently for each stream according to the single CoS mapping rules discussed above.

CoS frame mappings can use the DLC connection CoS in which case all DLC frames would receive the same scheduling treatment on the Ethernet side or use the frame CoS indicators such as P-bits, VID or IP DSCP in which case frames arriving on the same DLC could receive different Ethernet CoS treatment. In this case the IWF creates p-bits in the reverse (frame relay to Ethernet) direction as well as a MAC address.

Figure 18:
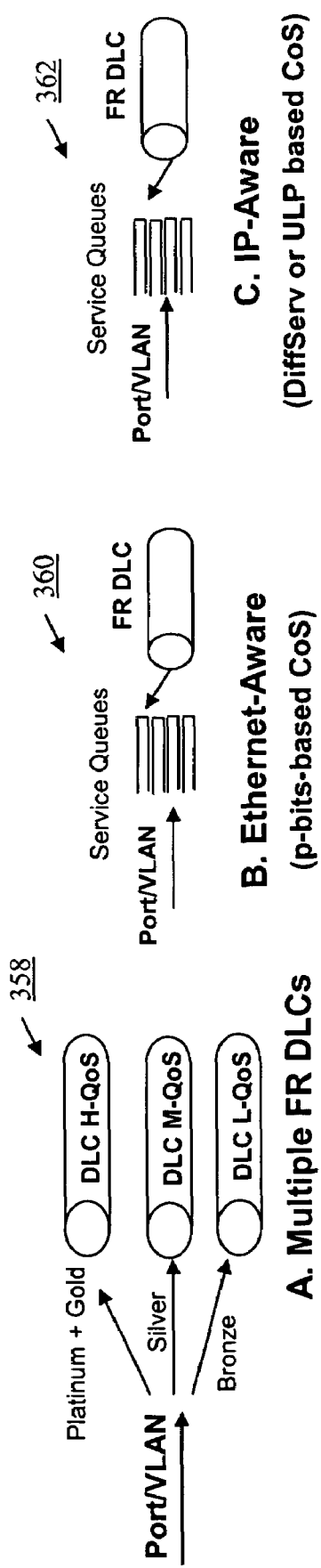
FIG. 18 is a diagram showing three examples of multiple CoS connection mapping.

FIG. 18 shows three examples of multiple CoS connection mapping. Example A 358 shows the case where multiple frame relay DLCs can support one or more Ethernet service classes by mapping a port/VLAN to a level of service for a DLC. Example B 360 shows the case where a single frame relay DLC can be used by service queues having p-bit awareness, i.e. p-bit arrangements are mapped to a DLC queue. Example C 362 uses a single frame relay DLC in which the service queue has awareness of the ULP or IP differentiated service.

Figure 19:
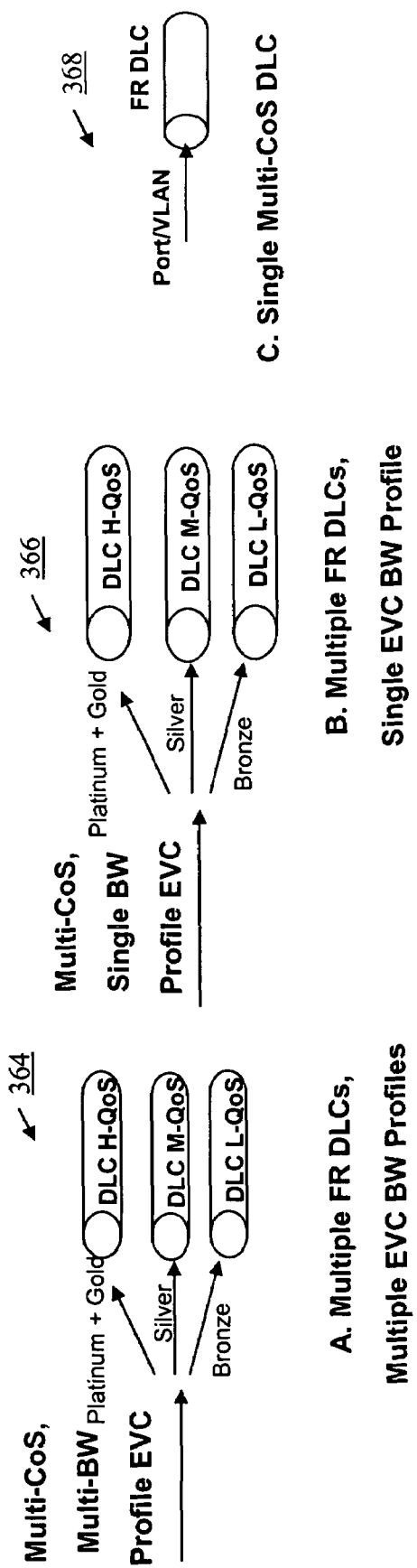
FIG. 19 is diagram showing three examples of bandwidth profile mapping in the Ethernet to frame relay direction.

FIG. 19 shows three examples of bandwidth profile mapping in the Ethernet to frame relay direction. In this arrangement, the bandwidth profile mapping will build on the parameter mappings and overhead calculations described above for single CoS EVC connections. Examples A 364 and B 366 are applicable when multiple DLCs are used. Example A 364 shows the case where multiple EVC profiles are used and each EVC bandwidth profile is mapped to a corresponding frame relay DLC. Example B 366 shows the case where a single EVC bandwidth profile is supported by estimating the percentage of EVC traffic mapped to each frame relay DLC. Single CoS parameter rules are applied separately to each EVC class/DLC pair.

Example C 368 shows the case where a single multi-CoS DLC is used. If there are multiple EVC bandwidth profiles, the EVC bandwidth profiles are aggregated before mapping to the frame relay DLC bandwidth profile. If there is a single EVC bandwidth profile, the same rules as described above for the single CoS mapping are applied.

FIG. 20 shows an example of the flexibility provided by the present invention in mapping between Ethernet p-bits and frame relay connections for different frame relay connection TP and DP values. Table 370 shows an example where the Ethernet p-bits support five service classes, representing five forwarding classes, with some classes supporting multiple drop precedence values, and a frame relay service that supports three services having various delay and loss guarantees. Although three frame relay services are used in this example, it is contemplated that the present invention can be arranged to support any combination of frame relay services and Ethernet service classes. In this example, the frame relay DE bit is used to represent drop precedence of the frames within a service class.

By way of example, row 372 shows the mapping of a "gold" Ethernet service class for an Ethernet PHB value of AF31, defined by p-bits value "110" to a real-time frame relay service class assigned to frame relay DLC ID 1, represented by frame relay TP 15 and DP 7 with the frame relay discard eligibility bit set to "0".

The present invention advantageously provides a system, method and function for service interworking between Ethernet and frame relay networks in a manner which maintains and supports class of service definitions from one network protocol to the other.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. An interworking device for supporting service interworking between an Ethernet communication network and a frame relay network, the service interworking device including:
   a first network interface operable to communicate with the Ethernet communication network using an Ethernet communication protocol;
   a second network interface operable to communicate with the frame relay communication network using a frame relay protocol; and
   a processing unit in communication with the first network interface and the second network interface, the processing unit:
      terminating frames received from a one of the frame relay communication network and the Ethernet communication network;
      mapping parameters corresponding to the received one of the frame relay and Ethernet frames into the other of the frame relay and Ethernet frames, the mapped parameters including circuit configuration control plane information and data plane parameters corresponding to individual frames, the circuit configuration control plane information including at least one of connection mapping information, class of service mapping information, and traffic parameters information, the class of service mapping being used by the processing unit to establish the data plane mapping parameters during frame processing.

2. The device according to claim 1 wherein connection mapping information includes mapping Ethernet connection data to a frame relay DLCI.

3. The device according to claim 2, wherein Ethernet connection data includes an Ethernet virtual LAN identifier.

4. The device according to claim 1 wherein the processing unit further determines a correction factor to map data rates between the Ethernet frames and the frame relay frames.

5. The device according to claim 1 wherein the Ethernet network supports multiple classes of service, and wherein, for the Ethernet to frame relay direction, a frame relay DLCI is assigned to each Ethernet class of service.

6. The device according to claim 1 wherein the Ethernet network supports multiple classes of service, and wherein, for the Ethernet to frame relay direction, a separate frame relay DLCI is assigned to at least one Ethernet class of service based on one or more of a virtual LAN identifier, a p-bits value and the Ethernet interface upon which the frame was received.

7. The device according to claim 1 wherein for the frame relay to Ethernet direction:
   the Ethernet supports multiple classes of service;
   the first network interface is a virtual LAN-aware interface; and
   a virtual LAN identifier is determined based on the frame relay DLCI value and a p-bits value is determined based on a frame relay DLCI class of service.

8. The device according to claim 1, wherein data plane parameters corresponding to individual frames include at least one of MAC address/virtual LAN identifier mapping to/from a DLCI, class of service indicators, congestion information, discard eligibility and a pause frame.

9. The device according to claim 8, wherein MAC address/virtual LAN identifier mapping to/from a DLCI includes mapping a frame relay DLCI to at least one of a virtual LAN identifier and a p-bits value and vice versa.

10. The device according to claim 8, wherein congestion information mapping includes mapping at least one of a forward explicit congestion notification (FECN) and a backward explicit congestion notification (BECN) bit in the frame relay frame with a p-bit in the Ethernet frame.

11. The device according to claim 8, wherein discard eligibility mapping includes mapping a discard eligibility (DE) bit in the frame relay frame with a p-bit in the Ethernet frame.

12. The device according to claim 8 wherein the discard eligibility mapping is based on an Ethernet per hop behavior.

13. The device according to claim 8, wherein the processing unit further performs one of dropping frame relay frames that exceed a maximum supported Ethernet frame length for frames traveling in the frame relay to Ethernet direction and fragmenting frame relay frames that exceed a maximum supported Ethernet frame length for frames traveling in the frame relay to Ethernet direction.

14. The device according to claim 1, wherein mapping parameters corresponding to the received one of the frame relay and Ethernet frames into the other of the frame relay and Ethernet frames includes:
   classifying parameters of a received frame;
   mapping and marking the parameters of a received frame into a frame to be transmitted; and
   forwarding the frame to one of the first and second network interfaces for transmission.

15. A method for service interworking between an Ethernet communication network and a frame relay network, the method comprising:
   terminating frames received from a one of the frame relay communication network and the Ethernet communication network;
   mapping parameters corresponding to the received one of the frame relay and Ethernet frames into the other of the frame relay and Ethernet frames, the mapped parameters including circuit configuration control plane information and data plane parameters corresponding to individual frames, the circuit configuration control plane information including at least one of connection mapping information, class of service mapping information, and traffic parameters information, the class of service mapping being used to establish the data plane mapping parameters during frame processing.

16. The method according to claim 15, wherein connection mapping information includes mapping Ethernet connection data to a frame relay DLCI.

17. The method according to claim 16, wherein Ethernet connection data includes an Ethernet virtual LAN identifier.

18. The method according to claim 15, further comprising determining a correction factor to map data rates between the Ethernet frames and the frame relay frames.

19. The method according to claim 15, wherein the Ethernet network supports multiple classes of service, and wherein the method further comprises, for the Ethernet to frame relay direction, assigning a frame relay DLCI to each Ethernet class of service.

20. The method according to claim 15, wherein the Ethernet network supports multiple classes of service, and wherein the method further comprises, for the Ethernet to frame relay direction, assigning a separate frame relay DLCI to at least one Ethernet class of service based on one or more of a virtual LAN identifier, a p-bits value and the Ethernet interface upon which the frame was received.

21. The method according to claim 15, wherein for the frame relay to Ethernet direction:
   the Ethernet supports multiple classes of service;
   the first network interface is a virtual LAN-aware interface; and the method further comprises:
determining a virtual LAN identifier based on the frame relay DLCI value; and determining a p-bits value based on a frame relay DLCI class of service.

22. The method according to claim 15, wherein data plane parameters corresponding to individual frames include at least one of a MAC address/virtual LAN identifier mapping to/from a DLCI, class of service indicators, congestion information, discard eligibility and a pause frame.

23. The method according to claim 22, wherein MAC address/virtual LAN identifier mapping to/from a DLCI includes mapping a frame relay DLCI to at least one of a virtual LAN identifier and a p-bits value and vice versa.

24. The method according to claim 22, wherein congestion information mapping includes mapping at least one of a forward explicit congestion notification (FECN) and a backward explicit congestion notification (BECN) bit in the frame relay frame with a p-bit in the Ethernet frame.

25. The method according to claim 22, wherein discard eligibility mapping includes mapping a discard eligibility (DE) bit in the frame relay frame with a p-bit in the Ethernet frame.

26. The method according to claim 22 wherein the discard eligibility mapping is based on an Ethernet per hop behavior.

27. The method according to claim 22, wherein the method further comprises one of dropping frame relay frames that exceed a maximum supported Ethernet frame length for frames traveling in the frame relay to Ethernet direction and fragmenting frame relay frames that exceed a maximum supported Ethernet frame length for frames traveling in the frame relay to Ethernet direction.

28. The method according to claim 17, wherein mapping parameters corresponding to the received one of the frame relay and Ethernet frames into the other of the frame relay and Ethernet frames includes:
classifying parameters of a received frame;
mapping and marking the parameters of a received frame into a frame to be transmitted; and
forwarding the frame to one of the first and second network interfaces for transmission.

29. The method according to claim 15, further comprising performing interworking with a third communication network employing a networking technology other than Ethernet and frame relay, the third communication network being coupled between the Ethernet communication network and the frame relay communication network, wherein the service interworking is performed on one of the Ethernet side and the frame relay side of the third communication network.

30. A storage medium storing a computer program which when executed by a processing unit performs a method for service interworking between an Ethernet communication network and a frame relay network, the method comprising:
terminating frames received from a one of the frame relay communication network and the Ethernet communication network;
mapping parameters corresponding to the received one of the frame relay and Ethernet frames into the other of the frame relay and Ethernet frames, the mapped parameters including circuit configuration control plane information and data plane parameters corresponding to individual frames, the circuit configuration control plane information including at least one of connection mapping information, class of service mapping information, and traffic parameters information, the class of service mapping being used to establish the data plane mapping parameters during frame processing.

31. The storage medium according to claim 30 wherein connection mapping information includes mapping Ethernet connection data to a frame relay DLCI.

32. The storage medium according to claim 31, wherein Ethernet connection data includes an Ethernet virtual LAN identifier.

33. The storage medium according to claim 30 wherein the method further comprises determining a correction factor to map data rates between the Ethernet frames and the frame relay frames.

34. The storage medium according to claim 30 wherein the Ethernet network supports multiple classes of service, and wherein the method further comprises, for the Ethernet to frame relay direction, assigning a frame relay DLCI to each Ethernet class of service.

35. The storage medium according to claim 30 wherein the Ethernet network supports multiple classes of service, and wherein the method further comprises, for the Ethernet to frame relay direction, assigning a separate frame relay DLCI to at least one Ethernet class of service based on one or more of a virtual LAN identifier, a p-bits value and the Ethernet interface upon which the frame was received.

36. The storage medium according to claim 30 wherein for the frame relay to Ethernet direction:
the Ethernet supports multiple classes of service;
the first network interface is a virtual LAN-aware interface; and
the method further comprises:
determining a virtual LAN identifier based on the frame relay DLCI value; and
determining a p-bits value based on a frame relay DLCI class of service.

37. The storage medium according to claim 34, wherein data plane parameters corresponding to individual frames include at least one of a MAC address/virtual LAN identifier mapping to/from a DLCI, class of service indicators, congestion information, discard eligibility and a pause frame.

38. The storage medium according to claim 37, wherein MAC address/virtual LAN identifier mapping to/from a DLCI includes mapping a frame relay DLCI to at least one of a virtual LAN identifier and a p-bits value and vice versa.

39. The storage medium according to claim 37, wherein congestion information mapping includes mapping at least one of a forward explicit congestion notification (FECN) and a backward explicit congestion notification (BECN) bit in the frame relay frame with a p-bit in the Ethernet frame.

40. The storage medium according to claim 37, wherein discard eligibility mapping includes mapping a discard eligibility (DE) bit in the frame relay frame with a p-bit in the Ethernet frame.

41. The storage medium according to claim 37, wherein the discard eligibility mapping is based on an Ethernet per hop behavior.

42. The storage medium according to claim 37, wherein the method further comprises one of dropping frame relay frames that exceed a maximum supported Ethernet frame length for frames traveling in the frame relay to Ethernet direction and fragmenting frame relay frames that exceed a maximum supported Ethernet frame length for frames traveling in the frame relay to Ethernet direction.

43. The storage medium according to claim 30, wherein mapping parameters corresponding to the received one of the frame relay and Ethernet frames into the other of the frame relay and Ethernet frames includes:
classifying parameters of a received frame;
mapping and marking the parameters of a received frame into a frame to be transmitted; and forwarding the frame to one of the first and second network interfaces for transmission.

44. The storage medium according to claim 30, wherein the method further comprises performing interworking with a third communication network employing a networking technology other than Ethernet and frame relay, the third communication network being coupled between the Ethernet communication network and the frame relay communication network, wherein the service interworking is performed on one of the Ethernet side and the frame relay side of the third communication network.

* * * * *